United States Patent [19]

Felger et al.

[11] Patent Number: 5,521,701
[45] Date of Patent: May 28, 1996

[54] OPTICAL POWER METER

[75] Inventors: Hubert T. Felger, Lake Hiawatha; George R. Grant, West Orange, both of N.J.

[73] Assignee: General Fiber Optics, Inc., Cedar Grove, N.J.

[21] Appl. No.: 375,083

[22] Filed: Jan. 17, 1995

Related U.S. Application Data

[63] Continuation of Ser. No. 160,455, Dec. 1, 1993, abandoned, which is a continuation of Ser. No. 828,236, Jan. 30, 1992, abandoned.

[51] Int. Cl.$^6$ ........................................... G01N 21/88
[52] U.S. Cl. ..................... 356/218; 359/110; 359/173; 356/73.1
[58] Field of Search ....................... 356/213, 218, 356/222, 221, 73.1, 73; 250/227.24; 385/88, 89, 134; 359/110, 124, 173

[56] References Cited

U.S. PATENT DOCUMENTS

| | | | |
|---|---|---|---|
| 4,632,544 | 12/1986 | Form | 356/73.1 |
| 4,708,422 | 11/1987 | Arnoux et al. | 356/73.1 |
| 4,726,676 | 2/1988 | Maslaney et al. | 356/73.1 |
| 4,940,892 | 7/1990 | Fisher et al. | 356/73.1 |
| 5,127,725 | 7/1992 | Mueller et al. | 356/73.1 |

OTHER PUBLICATIONS

Anritsu, Optical Loss Test Set MS9020A, 1989.
Shimadzu, Optical Power Meter LW–100.
Hewlett Packard, HP 8140A Optical Loss Test Set for fiber optic installation & maintenance.
Fotec, "Miniseries" Low Cost Fiber Optic Instruments.
EXFO, Fiberoptic Variable Optical Attenuator FVA–60A.
EXFO, Fiberoptic Dual Wavelength Attenuation Test Set FOT–90 & FOT–90 Series.
EXFO, Fiberoptic Light Source FLS–210.
EXFO, Fiberoptic Multi–Party Talk Set VCS–20A.
EXFO, Fiberoptic Visual Fault Locator FLS–230.
Tektronix, Optical Power Meter TFC200 (FiberChamp).
Philips, Fibre Optic Communication Optical Power Source OPS–5.
Philips, Fibre Optic Communication Optical Power Meter OPM–6.
Noyes, Fiber Systems FDDI Fiber Optic Loss Test Set.
Intelco, 190 Series Fiber Optic Test Sets.
Laser Precision, AM–3500 Hand Held Fiber Optic Power Meter.
Newport, Model 840 Hand Held Optical Power Meter.

*Primary Examiner*—Hoa Q. Pham
*Attorney, Agent, or Firm*—Lerner, David, Littenberg, Krumholz & Mentlik

[57] ABSTRACT

A modular optical power meter is provided which comprises a plurality of modules, each of which contains a matched, compatible set of elements consisting of a terminal connector, a source of optical power and a sensor for sensing optical power. These elements are configured for compatibility with each other and with the type of fiber optic system for which the particular elements comprising the module are intended for use. Each module can be separately calibrated and, upon insertion into the optical power meter's mainframe unit, automatically informs this unit of the module's optical characteristics. These modules are easy to use and avoid complications and errors in use. Errors resulting from temperature gradients also are eliminated because the source and sensor comprising each module always are maintained in close proximity to each other and are stored and installed as a unit. The mainframe unit can independently house, and independently operate with, a plurality of such modules to separately control the source, and separately display the optical power sensed by the sensor, comprising each module.

14 Claims, 18 Drawing Sheets

FOTS SYSTEM DESIGN

INTIALIZE FOTS

FOTS EXECUTION

FIG. 12  PROCESS INTERRUPTS
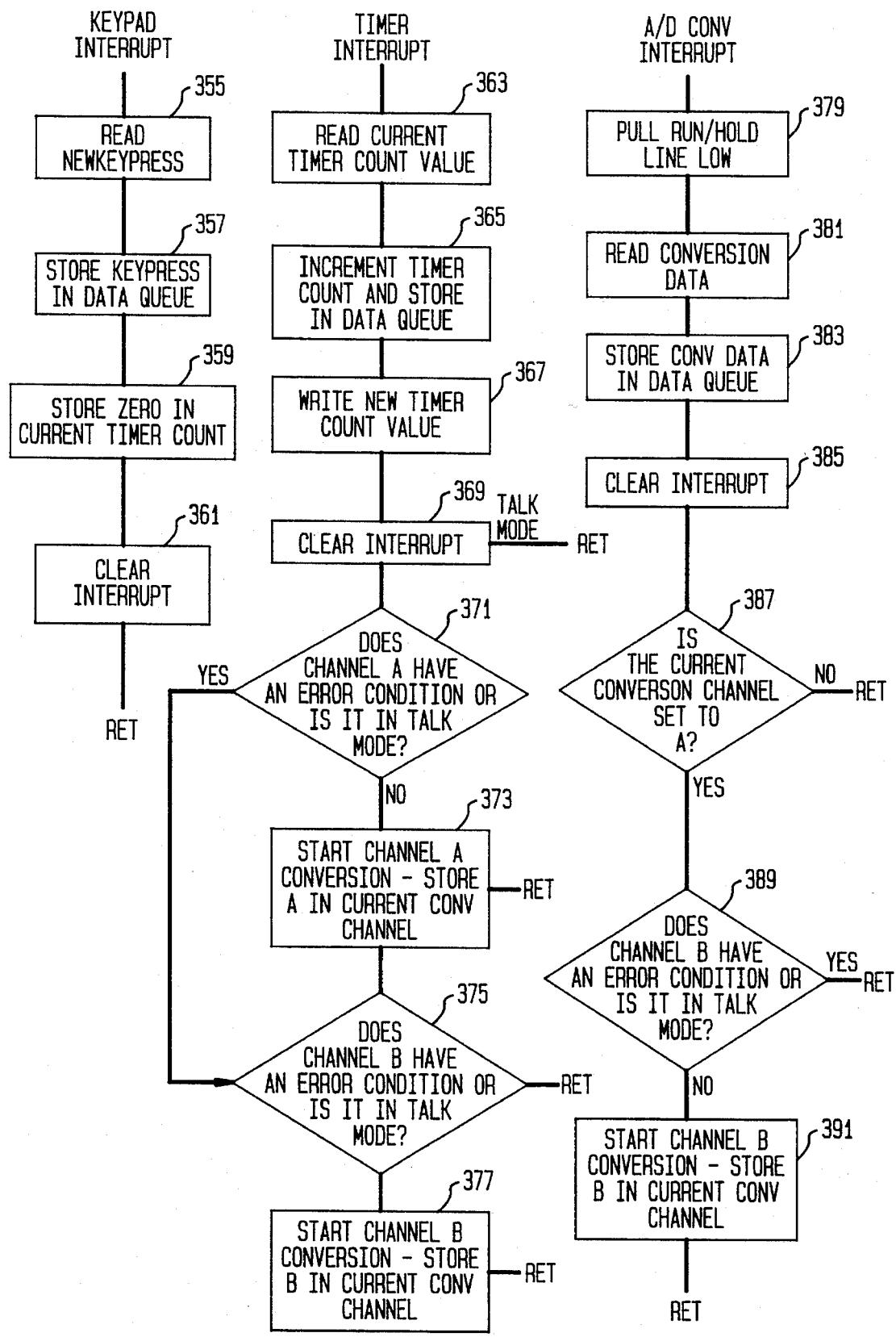

PROCESS CONVERSION DATA

PROCESS CONVERSION DATA

PROCESS KEYPAD DATA

FIG. 15A
DETAILED KEYPAD FUNCTIONS
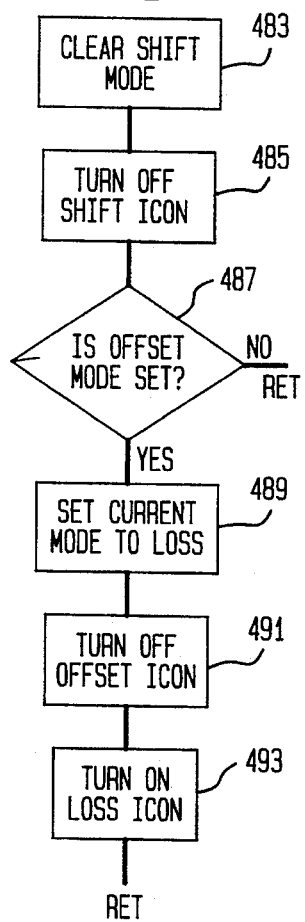
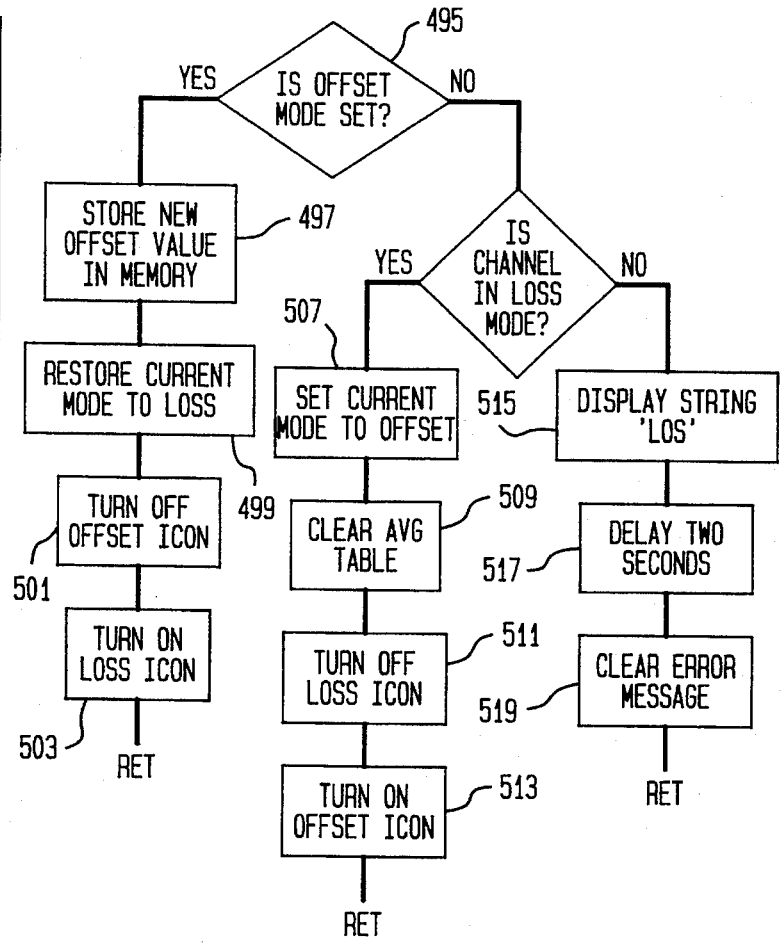
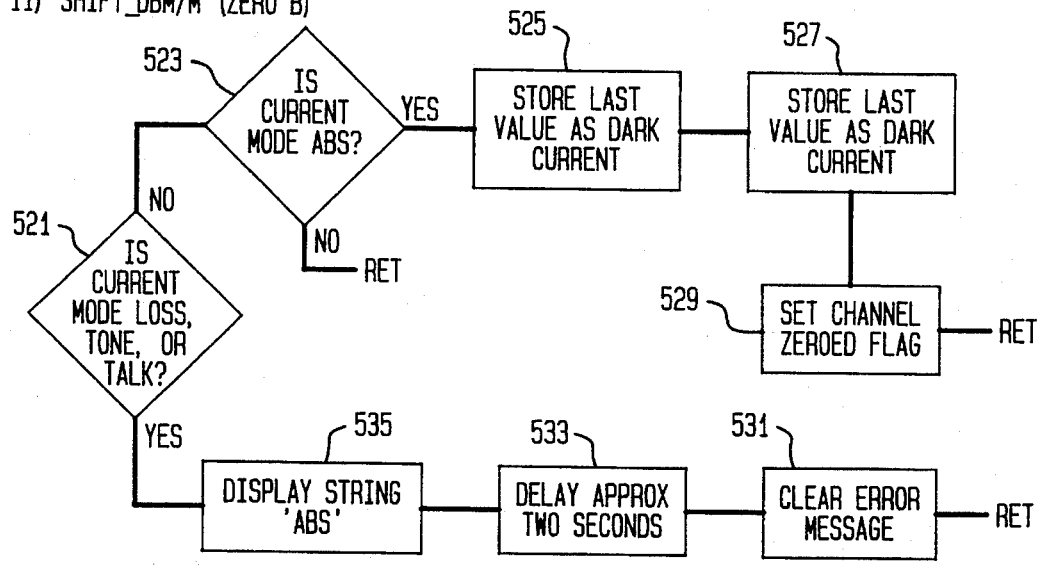

FIG. 15B  DETAILED KEYPAD FUNCTIONS CONT.
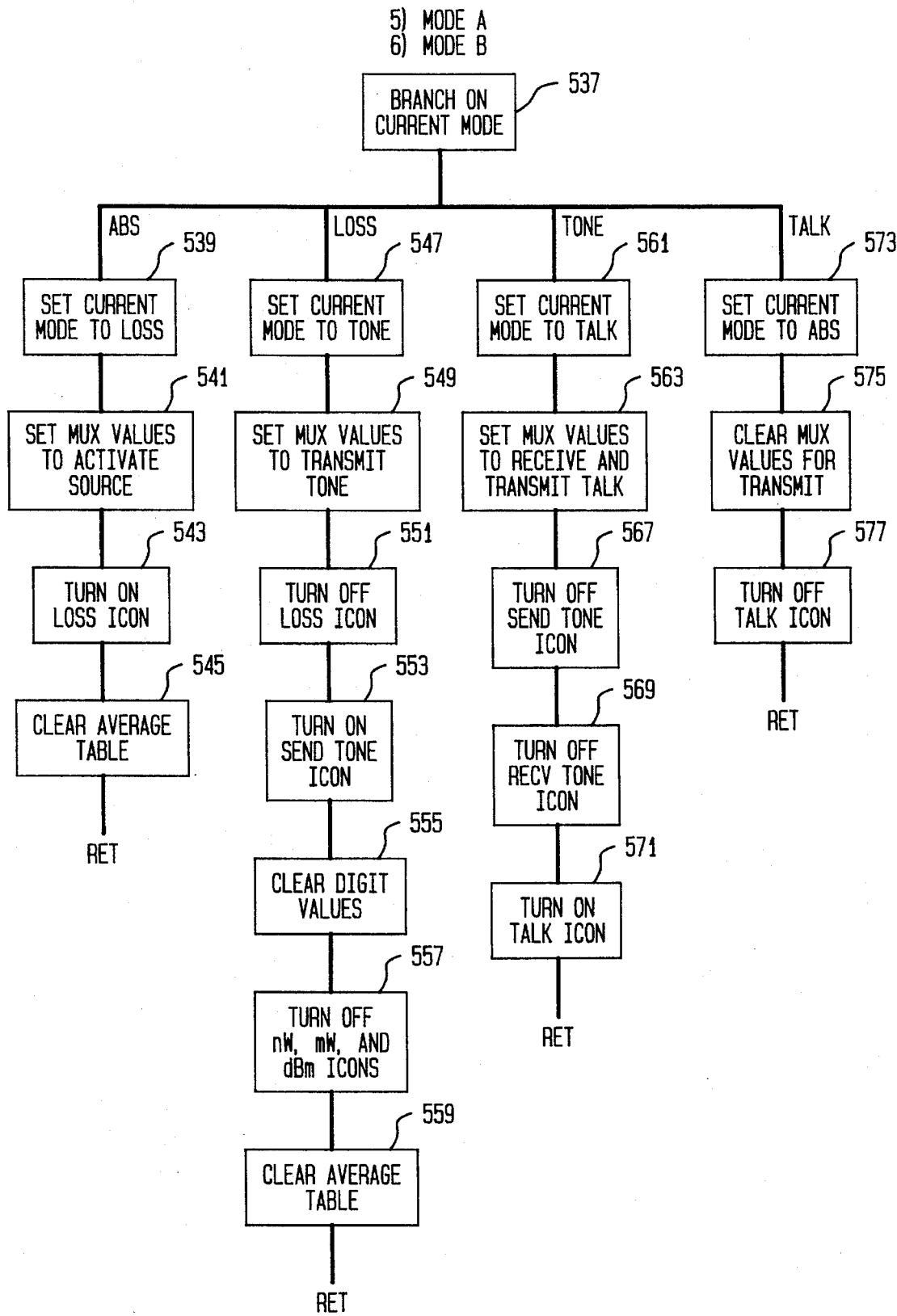

PROCESS TIMER DATA

DISPLAY VALUE ON LCD

DISPLAY STRING ON LCD

OPTICAL POWER METER

This is a continuation of application Ser. No. 08/160,455 filed Dec. 01, 1993, which is a continuation of application Ser. No. 07/828,236, filed on Jan. 30, 1992, both now abandoned.

BACKGROUND OF THE INVENTION

The present invention pertains to optical power meters and, more particularly, to apparatus and methods for automatically adapting and calibrating such meters to a plurality of optical cables, systems and applications.

Fiber optic cables are used in telephony, cable television, local area networks, industry and medicine. In communications, fiber optic cables carry pulsed modulated optical signals, originating from lasers or light emitting diodes, for communicating voice and data signals. In industry, fiber optic sensors transmit over fiber optic cables signals whose intensity and wavelength indicate the nature of a sensed parameter. Fiber optic cables are used in medicine to transmit, e.g., high powered laser beams for cutting and vaporizing tissue.

The proper utilization of fiber optic systems requires precise instruments for measuring optical power and testing the integrity of optical circuits. The design of such instruments is complicated by the many applications of, and types of facilities using, fiber optic systems. Depending upon the application and facility, a multitude of different operating powers, signal wavelengths and structural and mechanical configurations are possible. For example, a typical facility utilizing optical communication systems may comprise an integrated services digital network (ISDN) for telephonic communications and a local area network (LAN) for internal data communications. Since the optical, structural and mechanical characteristics of each of these systems are different, an optical power meter designed for testing one system often cannot be used for testing the other system. This problem is particularly acute with respect to the connectors used to terminate optical circuits at communications interfaces. A multitude of such connectors presently are being used within the communications industry, and, although various standards have been proposed, none has been widely adopted.

Various attempts have been made to make optical power meters more adaptable. For example, some optical power meters contain both a source of optical power and a sensor for sensing optical power. A source of optical power is necessary to test the integrity of optical circuits, and measure the attenuation of optical power caused by such circuits, when a source is not active on the circuit. A number of connecting adaptors also are sold with, or for, optical power meters to enable the meter's connection to some of the many different connectors used to terminate fiber optic circuits at communication interfaces. Means also have been provided for manually entering into the meter, if known, the wavelength of the optical source being measured to enhance the accuracy of optical power measurements.

Although these attempts have made such instruments somewhat more adaptable, they also have made them more complicated to use. The technician must repeatedly calibrate and recalibrate the instrument, depending upon the source of optical power, even if the source is that supplied by the instrument itself. If the instrument has adaptors for a particular type of terminal connector, a different application requires that the technician remove the adaptors and reconnect new adaptors, and this operation generally requires recalibration. If the technician is working in a facility in which two types of terminal connectors are employed, he or she is required to repeatedly remove and attach adaptors, and recalibrate the instrument, or use two instruments.

Several attempts to increase the adaptability of optical power meters have employed separate source and sensing modules. Depending upon the application, the technician can select and insert the appropriate source and sensing modules. There is no guarantee, however, that the particular modules selected will be compatible or that the instrument will be calibrated properly for these modules. The technician also must be concerned with selecting the correct modules and an appropriate connecting adaptor for the configuration. Whenever the configuration is changed, moreover, the instrument must be recalibrated, and whenever a different type of installation is tested, the modules or adaptors must be changed. All of these modifications complicate the testing and monitoring process, and substantially increase the likelihood of errors.

Errors also have been generated inherently in such plug-in systems as a result of temperature gradients. For example, a temperature gradient between the source module and sensing module, a condition which is likely if these modules are stored or installed separately, will generate errors, even if the instrument has been calibrated for the particular modules being used.

SUMMARY OF THE INVENTION

The present invention provides a modular optical power meter which is highly adaptable, easy to use and avoids the complications in use which have resulted in errors in testing using prior art optical power meters. The modules of the present invention each comprise a matched, calibrated, compatible set of elements consisting of a terminal connector, a source of optical power and a sensor for sensing optical power. These elements are configured for compatibility with each other and with the type of fiber optic system for which the particular elements comprising the module are intended for use. The modules of the present invention also avoid complications and errors in use by providing means for pre-calibrating each module using the particular elements comprising the module. The present invention, therefore, greatly simplifies the technician's task and substantially enhances performance. Errors resulting from temperature gradients also are eliminated because the source and sensor always are maintained in close proximity to each other and are stored and installed as a unit.

The present invention also provides enhanced adaptability and performance by providing a mainframe unit for an optical power meter which can independently house, and independently operate with, a plurality of such modules. The mainframe unit of the present invention, moreover, separately controls the source, and separately displays the optical power sensed by the sensor, comprising each module. The optical power meter of the present invention, therefore, effectively comprises a plurality of independent optical power meters in one unit, each of which is separately adapted and automatically calibrated through the insertion of pre-configured, pre-calibrated source/sensor/connector modules. With the present invention, a technician working in a facility comprising two different fiber optic systems, for example, can monitor and test both systems simultaneously without making any adaptor, module or calibration changes to the meter. A module particularly adapted for one of the systems, and the mainframe's display and control means associated with that module, are used for testing one system, and a module particularly adapted for the other system, and the mainframe's display and control means associated with that other module, are used for testing the other system.

In accordance with one aspect of the present invention, therefore, a fiber optic power meter is provided which comprises a mainframe unit and a plurality of separate modules. Each of these modules comprises a source of optical power, a sensor for sensing optical power, first connecting means for connecting the source and the sensor to a fiber optic circuit, and second connecting means for connecting the module to the mainframe unit. The mainframe unit comprises means for receiving and connecting the plurality of modules, a plurality of display means for displaying the optical power sensed by each of the modules' sensors, and a plurality of control means for controlling each of the modules' sources of optical power and associated display means.

The mainframe unit also comprises association means for associating each of the modules with one of the display means and one of the control means to form a plurality of independent test sets. Each of these test sets comprises a source of optical power, a control means, and a sensor for sensing optical power. The signal transmitted by each test set's associated source of optical power is sensed by the test set's associated sensor and displayed by the test set's associated display means. Each test set's associated source of optical power and associated display means, moreover, is controlled by the test set's associated control means.

The first connecting means on each of the modules preferably is adapted for connection to a type of optical terminal connector which is different from that for which the first connecting means on the power meter's other modules are adapted, in order to provide maximum flexibility and adaptability for the meter. Each of the modules, moreover, preferably comprises means for automatically informing the mainframe unit of the optical characteristics of the module's associated source.

In accordance with this aspect of the present invention, the mainframe unit of the power meter preferably comprises, for each of the test sets, means for reading the absolute optical power sensed by the test set's associated sensor, and means for reading the relative optical power, with respect to the transmitting power of the test set's associated source, sensed by the test set's associated sensor. The optical power meter also preferably comprises, for each of the test sets, means for transmitting an optical, carrier signal, means for modulating this signal with a further signal, and means for demodulating and sensing this further signal. This further signal may comprise a constant frequency signal within the audible frequency range, for enabling a technician to test the integrity of optical circuits without viewing the power meter's display means, or a voice modulated signal for, e.g., voice communications through a fiber optic circuit with another technician having a similar meter.

The mainframe unit of the present invention also preferably comprises, for each of the test sets, means for deactivating the test set's associated source when the relative optical power sensed by the test set's associated sensor becomes constant with respect to time. This feature further simplifies the testing procedure and enhances battery life. The mainframe unit of the optical power meter of the present invention, moreover, also preferably comprises, for each of the test sets, means for reading, storing and displaying the transmitting power of each of the test sets' associated sources. In a preferred embodiment, the optical power meter also comprises an output terminal for transmitting to a printer in digital format data collected by the meter.

In another aspect, the present invention comprises a separable, plug-in module for a fiber optic power meter. This module comprises a source of optical power, a sensor for sensing optical power, first connecting means for connecting the source and the sensor to a fiber optic circuit, and second connecting means for connecting the module to the power meter.

The source of optical power preferably comprises either a light emitting diode or a laser, and the sensor preferably comprises either a silicon diode, a germanium diode, or an indium-gallium-arsenide (InGaAs) diode. The sensitivity of the sensor, moreover, preferably is matched with, and calibrated to, the wavelength and magnitude of the source.

The first connecting means of the plug-in module preferably is adapted for connection to the connectors of an optical interface, such as a fiber distributed data interface (FDDI) or an interface for an integrated services digital network, and the second connecting means preferably comprises an electrical, plug-in connector. The plug-in module also preferably comprises calibrating means for calibrating the power of the source and the sensitivity of the sensor. The plug-in module also preferably comprises means for transmitting to the power meter the optical characteristics of the source, such as, e.g., the wavelength of the signal transmitted by the source.

Further aspects and features of the present invention will be appreciated from the detailed description below, in connection with the accompanying drawings.

BRIEF DESCRIPTION OF THE DRAWINGS

FIG. 12 is a flow diagram showing in greater detail the steps of the interrupt commands generally shown in FIG. 11.

FIG. 13($b$) is a continuation of the flow diagram of FIG. 13($a$).

FIG. 15(a) is a flow diagram showing in greater detail the steps of processing of key pad data generally shown in FIG. 14.

FIG. 15(b) is a continuation of the flow diagram of FIG. 15(a).

DETAILED DESCRIPTION OF THE PREFERRED EMBODIMENTS

Figure 1:
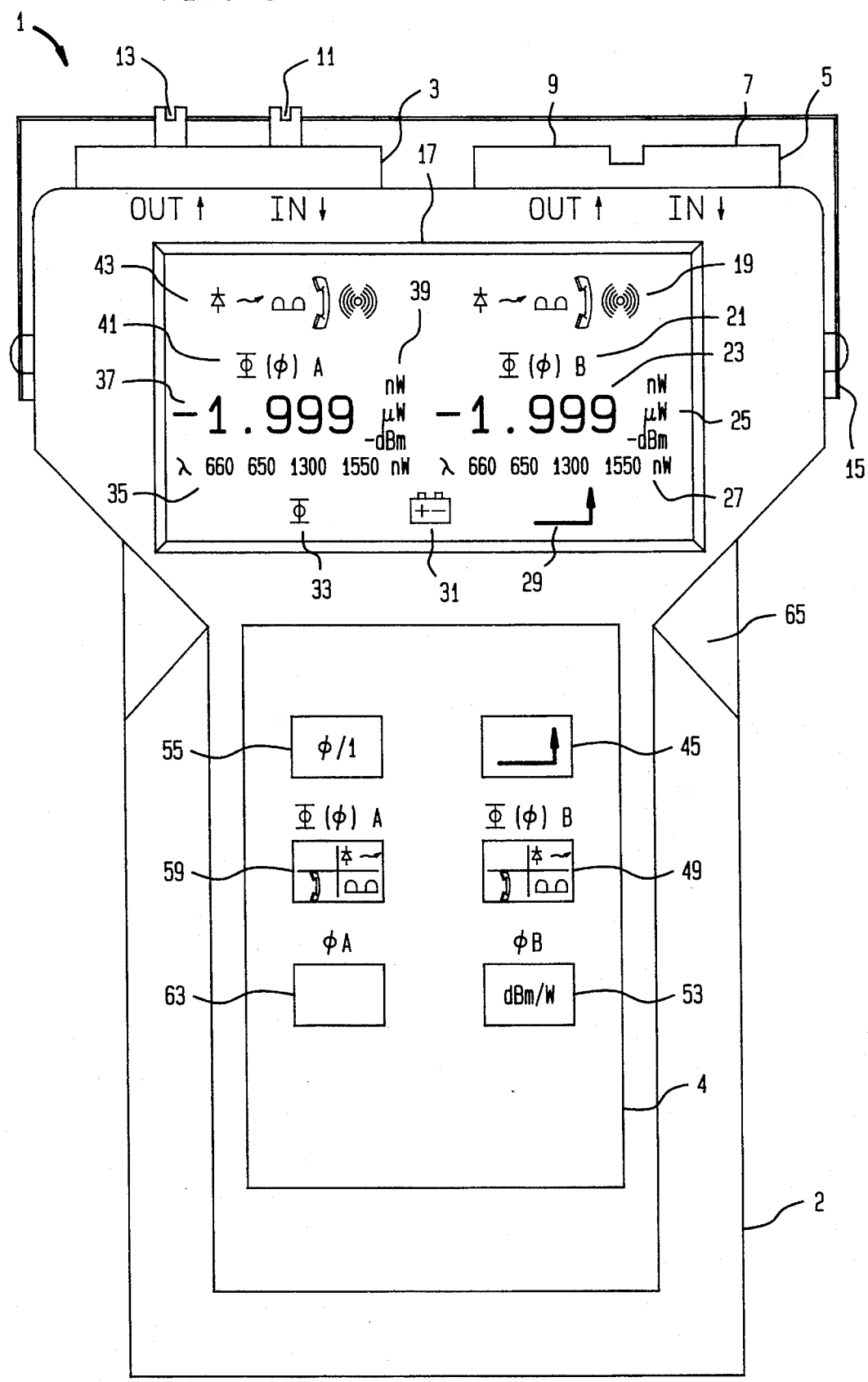
FIG. 1 is a front view of an optical power meter in accordance with the present invention.
Figure 2:
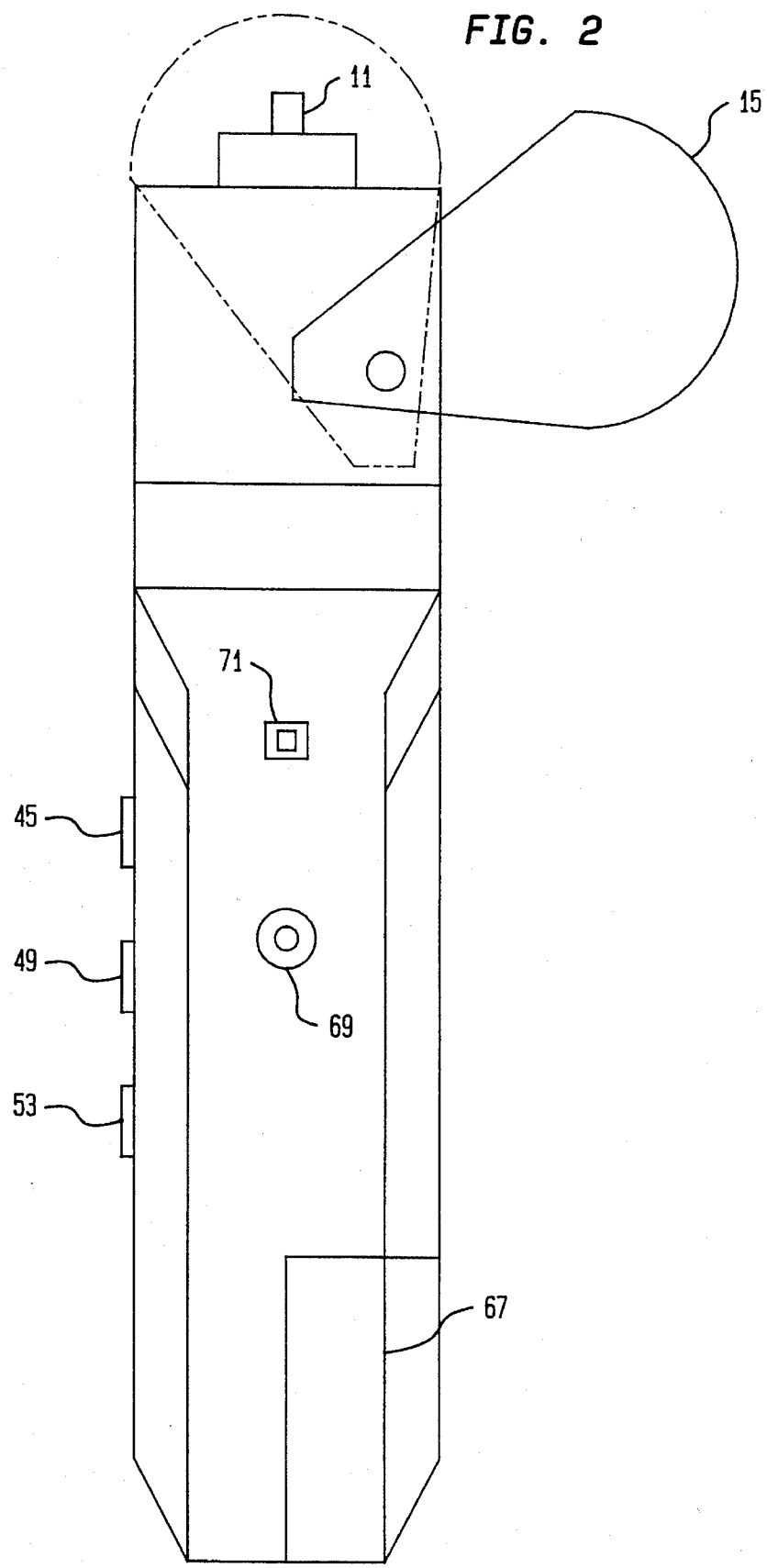
FIG. 2 is a right side view of the optical power meter shown in FIG. 1.

Front and right side views of an optical power meter 1 in accordance with the present invention are shown in FIGS. 1 and 2, respectively. Optical power meter 1 is enclosed within case 65. This case is approximately hand size and is EMI/RFI shielded to prevent erroneous readings in a high RF environment.

Optical power meter 1 comprises mainframe unit 2 and plug-in modules 3 and 5. Each of these modules comprises a source of optical power, a sensor for sensing optical power, means for connecting the source and the sensor to a fiber optic circuit, (e.g., fiber optic circuit 100 shown in FIG. 5) and means for connecting the module to the mainframe unit. Each of these modules also comprises a ROM, described below, in which identifying and calibrating data is stored for transmission to mainframe unit 2 upon the module's insertion into this unit. Means also are provided in each module for pre-calibrating the module, prior to its insertion into the mainframe unit, with respect to the power of the source and the sensitivity of the sensor with respect to the source.

Terminal connectors 13 and 11 connect module 3 to the terminals of a fiber optic circuit, and terminal connectors 9 and 7, which are recessed within module 5, connect module 5 to the terminals of a fiber optic circuit. The sources of optical power within modules 3 and 5 transmit optical signals at selected wavelengths and power through terminal connectors 13 and 9, respectively, and incoming optical power is received from the circuits for these modules through terminal connectors 11 and 7, respectively. A rotatable protective cover 15 protects these modules and their corresponding terminal connectors when optical power meter 1 is not in use.

Modules 3 and 5 are specially adapted and precalibrated for monitoring and testing fiber optic circuits within particular types of fiber optic systems. Module 3, e.g., is specially adapted and pre-calibrated for testing and monitoring optical, telephonic communication systems and, therefore, has a terminal connector used by such systems, e.g., the ST-type connector, and operates at a power, sensitivity and wavelength, e.g., 1300 nm, which is compatible with such systems. Module 5, on the other hand, is specially adapted and pre-calibrated for testing and monitoring local area networks (LANs) and, therefore, has a terminal connector used by such networks, e.g., the FSD-type connector, and operates at a power, sensitivity and wavelength compatible with such networks.

Optical power meter 1 is intended for use with a plurality of modules such as plug-in modules 3 and 5. A technician typically may carry with him or her a module specially adapted and calibrated for each of the types of fiber optic installations which he or she is likely to encounter during the day. The means for connecting each of these modules within mainframe unit 2 preferably is a conventional, plug-in type electrical connector for easy installation and removal. On the other hand, more permanent type connectors also are within the scope of the invention.

Mainframe unit 2 has a side-lighted, LCD display screen 17 and a plurality of control buttons, viz., shift key 45, mode keys 49 and 59, power units key 53, on/off key 55, and power averaging key 63. Display screen 17 contains various sections, each of which is dedicated to displaying particular indicators (icons) or data, viz., mode indicators 19 and 43, offset indicators 21 and 41, power displays 23 and 37, power units indicators 25 and 39, wavelength indicators 27 and 35, shift indicator 29, low battery indicator 31, and power averaging indicator 33.

Module 3 is associated with, and controlled by, mode key 59, and the modes controlled by this key, the optical characteristics and identity of module 3, and the data collected through module 3, all are reflected by the status of mode indicators 43, offset indicators 41, power units indicators 39, power display 37 and wavelength indicators 35. Module 3, these sections of display screen 17, and mode key 59 together comprise an associated, independent test set, referred to below as test set A. Similarly, module 5 is associated with, and controlled by, mode key 49, and the modes controlled by this key, the optical characteristics and identity of module 5, and the data collected through module 5, all are reflected by the status of mode indicators 19, offset indicators 21, power display 23, power units indicators 25 and wavelength indicators 27. Module 5, these sections of display screen 17, and mode key 49 together comprise an associated, independent test set, referred to below as test set B.

Mainframe unit 2 contains slide switch 71, headphone/microphone jack 69 and an RS 232 port (not shown) within battery housing 67. Slide switch 71 activates edge lights (not shown) for lighting display screen 17 to make this screen visible to a technician working in a dark environment. Slide switch 71 has three positions, momentary on, off and on. The momentary on position provides a brief lighting of the display screen to enable its viewing without excessive battery use.

Headphone/microphone jack 69 provides ring, tip and sleeve contacts to enable voice communication, using a telephone (not shown), through a fiber optic circuit. This capability enables a technician to communicate with, e.g., another technician testing the fiber optic system and having a similar test unit.

The RS 232 port enables the sending of serial, digital data from optical power meter 1 to a printer (not shown) to provide a permanent record of readings and instrument settings.

Optical power meter 1 is powered by a rechargeable battery pack (also not shown) located within battery housing 67. The RS 232 port located within this housing functions, in the alternative, as an input jack to provide power to optical power meter 1 from an AC source using a conventional AC/DC convertor when this battery pack is not in place.

In order to operate optical power meter 1, at least one module must be within mainframe unit 2. For example, with module 3 in place within the mainframe, one end of a fiber optic circuit is connected to terminal connector 11, and, if an active optical source is present on this circuit, absolute power readings for this circuit can be made without the use of the optical source within module 3. On the other hand, if no active source is present and the module's internal source is required for testing, the circuit's opposite end is connected to terminal connector 13. Optical power meter 1 operates in a similar manner with respect to module 5, the source comprising this module, and the output and input terminal connectors for this module, i.e., terminal connectors 9 and 7, respectively.

The on and off states for both test sets A and B of optical power meter 1 are controlled by on/off key 55. If both test sets are off, depressing this key turns both of them on and vice versa.

Mode keys 49 and 59, power units key 53 and power averaging key 63 each have a normal function mode and a shifted function mode. Icons representing these keys' normal functions are displayed on the face of the keys, and icons representing their shifted functions are displayed on front panel 4 of mainframe unit 2, directly above these keys. All of these icons also have a corresponding icon, which is lighted when the particular mode corresponding to the icon is active, within display screen 17.

The normal/shifted function modes for all of these keys are controlled by shift key 45. If these keys are in the normal mode, depressing shift key 45 causes all of them to enter the shifted mode and vice versa. If power meter 1 is in the shifted mode, shift indicator 29 on display screen 17 is lighted.

Mode key 59 controls test set A, and mode key 49 controls test set B. Each of these keys operates independently and in a similar manner. Four normal modes of operation and two shifted modes of operation are controlled by each of these keys. The normal modes of operation are: (1) reading absolute power; (2) reading relative power, i.e., the loss of, or the attenuation caused by, the circuit with respect to the transmitting power of the source; (3) tone modulation of the test set's associated source; and (4) voice modulation of the test set's associated source. The two shifted modes are: (1) read and store offset power; and (2) display offset power.

When on/off key 55 is depressed to cause optical power meter 1 to go from the inactive state to the active state, test sets A and B both automatically enter the absolute power reading mode. Depressing either mode key, e.g., mode key 59, causes the associated test set, test set A in this example, to enter the relative power reading mode. Depressing mode key 59 again causes this test set to enter the tone modulation mode. Depressing mode key 59 again causes this test set to enter the voice modulation mode. Finally, depressing mode key 59 one more time causes test set A to return to the absolute power reading mode. Test set B operates in the same manner in response to successive activations of mode key 49. Each of the icons displayed on the faces of mode keys 49 and 59 represents one of the successive operating modes controlled by these keys, and the icon's clockwise relationship represents the modal transitions which occur upon successive depressions of these keys.

An icon corresponding to each of the icons displayed on the face of mode key 59 appears in mode indicators 43. The particular indicator which is lighted in display screen 17 corresponds to the active mode of test set A. Similarly, an icon corresponding to each of the icons displayed on the face of mode key 49 appears in mode indicators 19, and the particular indicator which is lighted in display screen 17 corresponds to the active mode of test set B.

In the absolute power reading mode, test set A reads the absolute optical power received at terminal connector 11 and displays this power in power display 37. Similarly, in the absolute power mode, test set B reads the absolute power received at terminal connector 7 and displays this power at power display 23.

In the relative power mode, test set A determines the loss in, or attenuation of, the fiber optic circuit connected to terminal connectors 13 and 11. The test set reads the relative optical power, with respect to the transmitting power of the source within module 3, and displays this relative power in decibels (dB) in power display 37. Similarly, in the relative power mode, test set B determines the loss in, or attenuation of, the fiber optic circuit connected to terminal connectors 9 and 7. The test set reads the relative optical power, with respect to the optical power transmitted from the source within module 5, and displays this relative power in decibels in power display 23. If test set A is in the relative power mode, the conventional icons for a light emitting diode within mode indicators 43 are lighted, and if test set B is in this mode, these conventional icons are lighted in mode indicators 19. Also, if either test set is in this mode, the dBm indicator within the test set's corresponding power units indicators 39 or 25 is lighted intermittently to indicate the reading of relative power in decibels.

If test set A is in the tone modulation mode, the optical signal transmitted from the source within module 3 and through terminal connector 13 is modulated with a continuous frequency signal within the audible range. If this signal is detected at terminal connector 11 above a predetermined threshold, an audible tone is transmitted from a small transmitter (not shown) within mainframe unit 2. Also, if this tone is detected, the conventional icon for sound within mode indicators 43 is lighted. Similarly, in the tone modulation mode for test set B, the optical signal transmitted from the source within module 5 through terminal connector 9 is modulated with a continuous frequency signal within the audible range. If this signal is detected above a predetermined threshold at terminal connector 7, an audible signal is transmitted from this same transmitter within mainframe unit 2. Also, as with test set A, if this signal is received above a predetermined threshold, the conventional icon for sound within mode indicators 19 is lighted.

Finally, in the voice modulation mode, test sets A and B, rather than modulating the signals transmitted from their corresponding sources with a constant frequency audible signal, modulate these signals with the voice signal transmitted to mainframe unit 2 through headphone/microphone jack 69. A corresponding voice signal received on test sets A or B, through terminal connectors 11 or 7, respectively, is demodulated and transmitted through headphone/microphone jack 69. This mode enables a technician to, e.g., use one test set for monitoring and testing, and the other test set for communicating with another technician through the fiber optic system being monitored. If test set A or B is in the voice modulation mode, the conventional icon for a telephone handset in mode indicators 43 and 19, respectively, is lighted.

Power units key 53 controls both test sets A and B and determines whether these test sets display their corresponding power readings in dBm units (decibels above or below 1 milliwatt) or watts. If optical power meter 1 is displaying power in decibel units, depressing power units key 53 causes power to be displayed in watts and vice versa. The units for the display of power for test sets A and B are displayed by the lighting of the appropriate unit indicator within indicators 39 and 25, respectively.

Optical power meter 1 displays, for both test sets, power readings on an instantaneous basis or on an average basis (averaged over ten consecutive samples). These two modes are controlled by power averaging key 63. If test sets A and B are in the instantaneous power mode, depressing power averaging key 63 causes them to change to the averaging mode and vice versa. If optical power meter 1 is in the averaging mode, power averaging indicator 33 is lighted within display screen 17.

If test set A is in the relative power (loss) mode and shift key 45 is depressed, depressing mode key 59 causes test set A to enter the offset calculation mode. In this mode, the technician may connect a short fiber optic patch cable between terminal connectors 13 and 11 to measure the transmitting power of the source within module 3. Also, in this mode, offset indicators 41 in display screen 17 are lighted. By depressing mode key 59 again while in this mode, the transmitting power of the source within module 3 is displayed at power display 37 and simultaneously stored in a non-volatile RAM, described below.

The offset value for test set B is measured, stored and displayed in a similar manner. Again, if test set B is in the relative power (loss) mode and shift key 45 is depressed, the offset mode is entered. Offset indicators 21 within display screen 17 are lighted, and the transmitting power of the source within module 5 transmitted through terminal connector 9 to terminal connector 7, via a fiber optic patch cable, is displayed in power display 23 and, simultaneously, stored in a non-volatile RAM.

If optical power meter 1 is turned off, the previously stored offset values for test sets A and B are preserved in this RAM, and these same values can be used for future relative power readings. The magnitude of the previously stored offset values for channels A and B also can be recalled and displayed in power displays 37 and 23, respectively, by depressing mode keys 59 and 49, respectively, in the shifted mode, when test sets A and B, respectively, are in the absolute power modes.

Depressing power averaging key 63, in the shifted mode, zeros all circuits for test set A. Similarly, depressing power units key 53, in the shifted mode, zeros all circuits for test set B.

As explained above, modules 3 and 5 automatically transmit to mainframe unit 2 the wavelength of the source within these modules. Upon inserting module 3, the wavelength of the source within module 3 automatically is displayed by the lighting of the appropriate indicator of wavelength indicators 35. Similarly, upon inserting module 5, the wavelength of the source within module 5 automatically is displayed by the lighting of the appropriate indicator of wavelength indicators 27. If the wavelength of the source within a particular module inserted within mainframe unit 2 does not correspond to one of the indicators within wavelength indicators 35 or 27, the left most icon, "λ," is displayed within the appropriate indicators.

If the batteries powering optical power meter 1 have insufficient power, the power meter is deactivated, and low battery indicator 31 is displayed in display screen 17.

Figure 4:
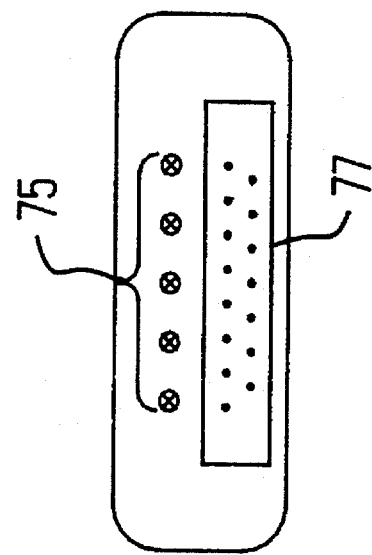
FIG. 4 is a bottom view of the module shown in FIG. 3.
Figure 3:
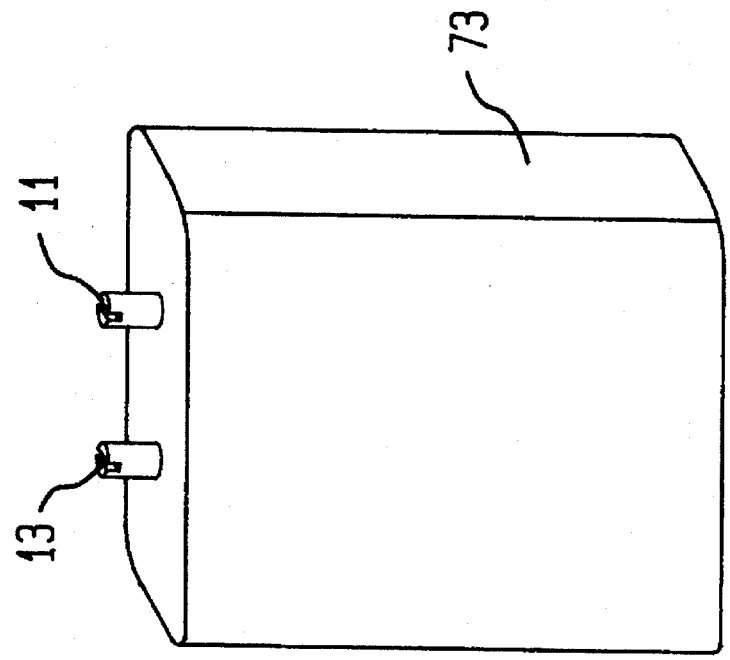
FIG. 3 is a perspective view of a separable source/sensor/connector module in accordance with the present invention.

A perspective view of module 3 is shown in FIG. 3, and a bottom view of this module is shown in FIG. 4. The physical configuration of module 5, and each of the other modules used with optical power meter 1, is identical to that of module 3, except for terminal connectors 11 and 13. As explained above, the terminal connectors for each of the modules are adapted specially to the type of fiber optic system for which the particular elements comprising the module are intended for use. The terminal connectors, therefore, may be, e.g, the ST, SMA or FSD type terminal connectors.

Module 3 is enclosed by a hardened, plastic case 73. The bottom surface of the module, which connects with mainframe unit 2, contains calibrating screws 75 and conventional electrical (J1-type) connector 77. This connector plugs into a corresponding connector located at the bottom of the housing within mainframe unit 2 which receives and holds each module.

Calibrating screws 75 consist of five separate, small calibrating screws. Four of these screws calibrate the sensitivity of the sensor within module 3, with respect to various units of measurement at full scale, and one of these screws adjusts the magnitude of the power transmitted by the source of optical power within module 3. These calibrations are explained in greater detail with respect to FIGS. 7 and 8.

Figure 5:
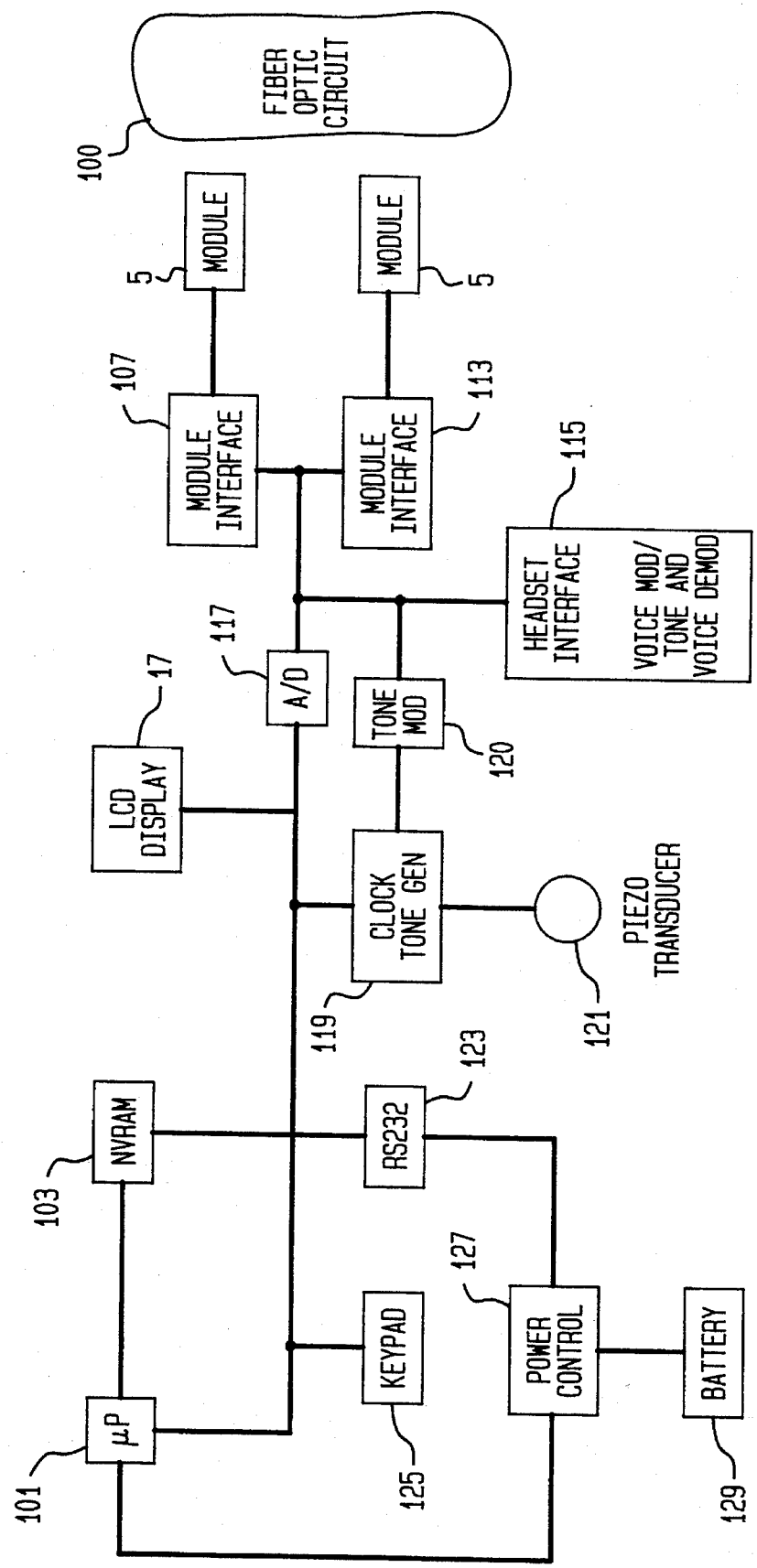
FIG. 5 is a functional block diagram for an optical power meter in accordance with the present invention.

FIG. 5 is a functional block diagram for optical power meter 1. The control program for the power meter, explained below in connection with FIGS. 9–18, is executed by microprocessor 101. This program is stored in an EEPROM associated with this microprocessor and operates in combination with non-volatile RAM (NVRAM) 103 which stores processed data, offset values, "dark" current values (explained below), and other calculated data and values.

Power control 127 provides an interface to battery pack 129. This interface includes an input jack for receiving power from an AC source using a conventional AC/DC convertor when battery pack 129 is removed. This jack also functions as an RS 232 port for the transmission of data to a printer (not shown) when battery pack 129 is removed. Under these circumstances, the power source for the printer also provides power to optical power meter 1.

Power control 127 also monitors the activity of microprocessor 101 and the power of batter pack 129. If the microprocessor is inactive for a predetermined period, e.g., five minutes, power control 127 automatically deactivates optical power meter 1. If the power of the batteries falls below a predetermined level, power control 127 notifies microprocessor 101 which lights low battery indicator 31. The microprocessor also deactivates the optical power meter under these circumstances.

Module interfaces 107 and 113 provide an interface for the communication of data between mainframe unit 2 and modules 3 and 5, respectively. Raw input signals from the sensors within each of these modules are converted to digital form by A/D convertor 117. If both modules are in place and operating, A/D convertor 117 alternately converts data from each module. The output from A/D convertor 117 is provided to microprocessor 101 at a rate of approximately one sample every 12 milliseconds. Microprocessor 101 uses these samples to update LCD display 17 approximately once every second.

LCD display 17 contains power display areas 37 and 23, for test sets A and B, respectively, and all of the indicators and icons previously discussed. These display areas, indicators and icons all are controlled by microprocessor 101, in response to the control program (discussed below).

Microprocessor 101 receives keypad data from keypad 125. This keypad contains detectors for indicating the activation of keys 55, 59, 63, 45, 49 and 53. These detectors provide corresponding activation signals to the microprocessor.

System timing is controlled by clock 119 which produces a continuous 8 MHz signal. Dividers within clock 119 divide this signal to provide slower timing signals used by power meter 1, including a 2 KHz signal for providing an input tone signal to piezoelectric transducer 121. Microprocessor 101 effects the transmission of this 2 KHz signal to piezoelectric transducer 121 if either test set A or B is in the tone modulation mode and the tone is detected above a predetermined threshold at the test set's associated input terminal.

Headset interface 115 provides an interface for headphone/microphone jack 69. This interface modulates the optical signals transmitted from a test set's source with voice signals received at headphone/microphone jack 69. Headset interface 115 also demodulates voice and tone signals received on the test set's input terminal and transmits this signal through headphone/microphone jack 69. Tone modulator 120 modulates the optical signals transmitted from a test set's source a tone signal from clock/tone generator 119.

RS 232 interface 123 controls the transmission of data from optical power meter 1 to an associated printer (not shown). Microprocessor 101 formats these data in NVRAM 103 prior to their transmission to RS 232 interface 123. These data are transmitted from this interface to the printer through the RS 232 port/jack within power control 127, previously described.

Figure 6:
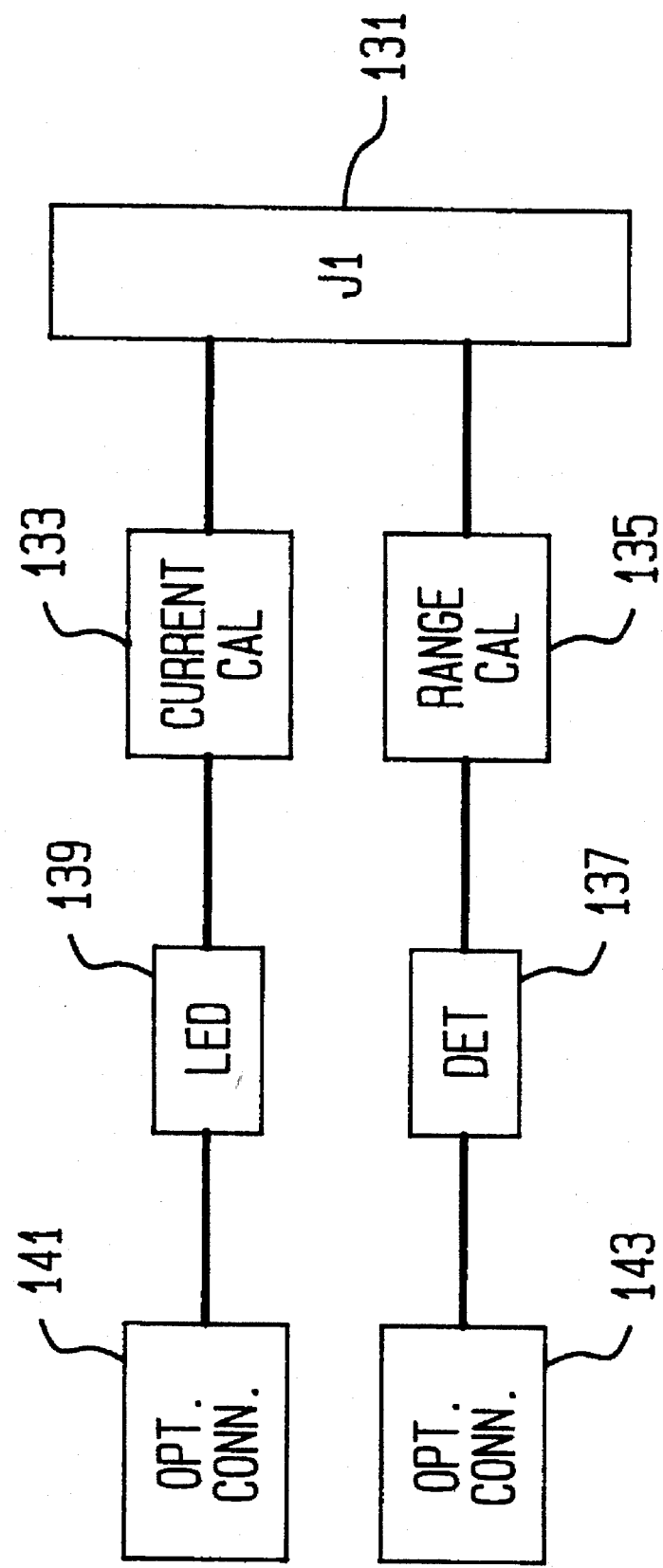
FIG. 6 is a functional block diagram for source/sensor/connector module in accordance with the present invention.

A functional block diagram of a separable source/sensor/connector module in accordance with the present invention is shown in FIG. 6. Each module comprises connector 131, for providing plug-in electrical and mechanical connection to mainframe unit 2, and terminal connectors 141 and 143, for providing connection to the terminals of an optical interface. Connector 131 is a conventional, J1-type connector, and optical connectors 141 and 143 may comprise any of the known types of terminal connectors used on optical interfaces.

Each module also contains a source 139 of optical power and a sensor 137 for sensing optical power. The source may be, e.g., a LED (light emitting diode) or laser, and the sensor may be, e.g., a silicon diode, a germanium diode or an indium-gallium-arsenide (InGaAs) diode. These elements are selected for compatibility with each other and with the type of fiber optic system for which the particular elements comprising the module are intended for use. Since the source and sensor are packaged as a unit and always are in close proximity to each other, errors due to temperature gradients between the source and sensor are eliminated.

Each of these modules also contains a current calibrator 133 and a range calibrator 135 for calibrating, respectively, source 139 and sensor 137. Current calibrator 133 adjusts the magnitude of current driving source 139 and, as a result, the magnitude of optical power transmitted from this source through terminal connector 141. This current is nominally set at approximately 100 ma. Current calibrator 133 also automatically provides a signal to mainframe unit 2 identifying the wavelength of the module's source upon insertion of the module into this unit. Range calibrator 135 calibrates sensor 137 for four full-scale values, viz., 1.2 milliwatts, 120 microwatts, 12 microwatts, and 1.2 microwatts. These calibrations are effected at the transmitting wavelength of source 139 and preferably using source 139.

Figure 7:
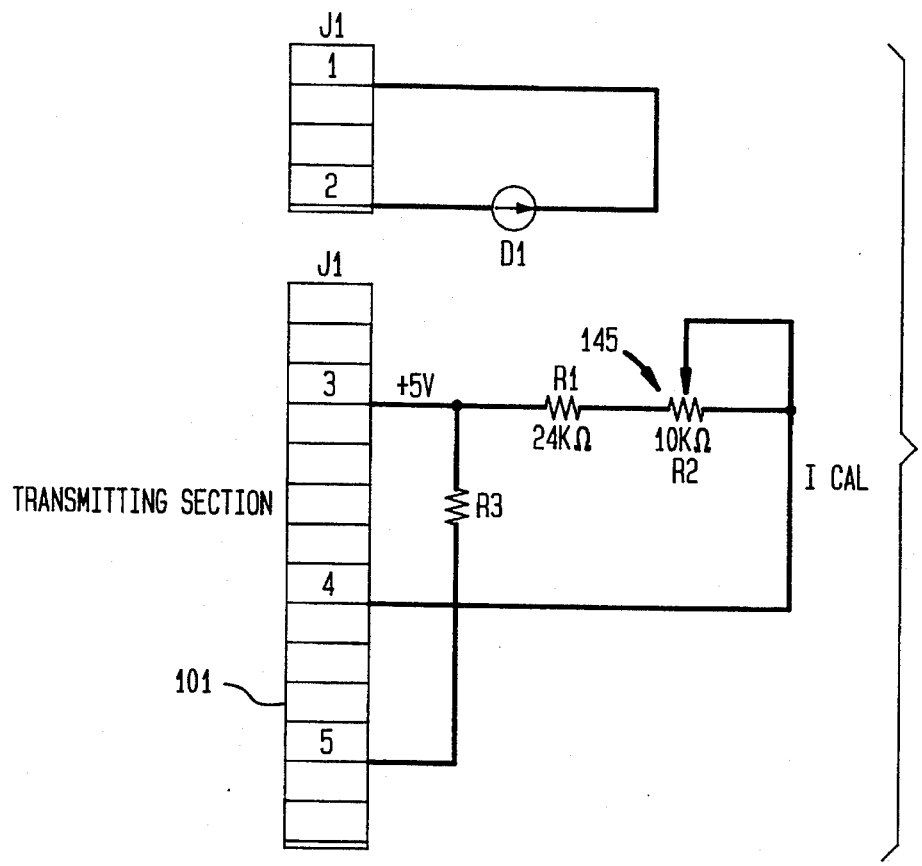
FIG. 7 is a circuit diagram for the optical source and current calibrator shown in FIG. 6.
Figure 8:
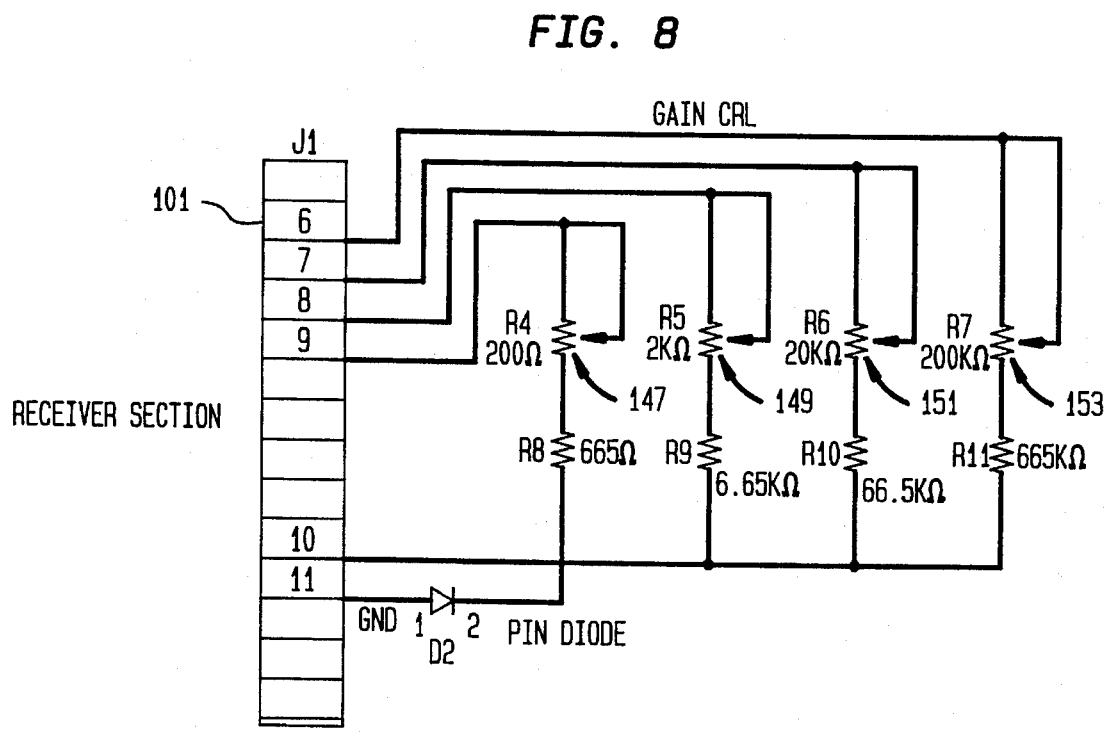
FIG. 8 is a circuit diagram for the optical sensor and range calibrator shown in FIG. 6.

FIG. 7 is a circuit diagram for source 139 and current calibrator 133, and FIG. 8 is a circuit diagram for sensor 137 and range calibrator 135. Source 139 comprises light emitting diode D1 which is connected to pins 1 and 2 of the J1 connector 101. The magnitude of current transmitted through diode D1 is controlled by potentiometer 145 whose setting is controlled by one of the screws comprising calibration screws 75.

The magnitude of R3 is selected on the basis of the transmitting wavelength of D1. The voltage between pins 3 and 5 of the J1 connector is proportional to the magnitude of R3. Mainframe unit 2 reads this voltage and, based upon a correlation factor, determines the operating wavelength of the source comprising the module based upon this voltage. The mainframe unit uses this information to light the appropriate indicator within wavelength indicators 35 or 27.

The various full scale calibrations of sensor 137 are effected by range calibrator 135 using potentiometers 147, 149, 151 and 153. Each of these potentiometers controls one of the full scale ranges of sensor 137. Like the potentiometer of current calibrator 133, each of these potentiometers is adjusted by adjusting one of the screws comprising calibration screws 75. The module's sensor comprises diode D2 which is connected between pins 10 and 11 of the J1 connector.

Figure 9:
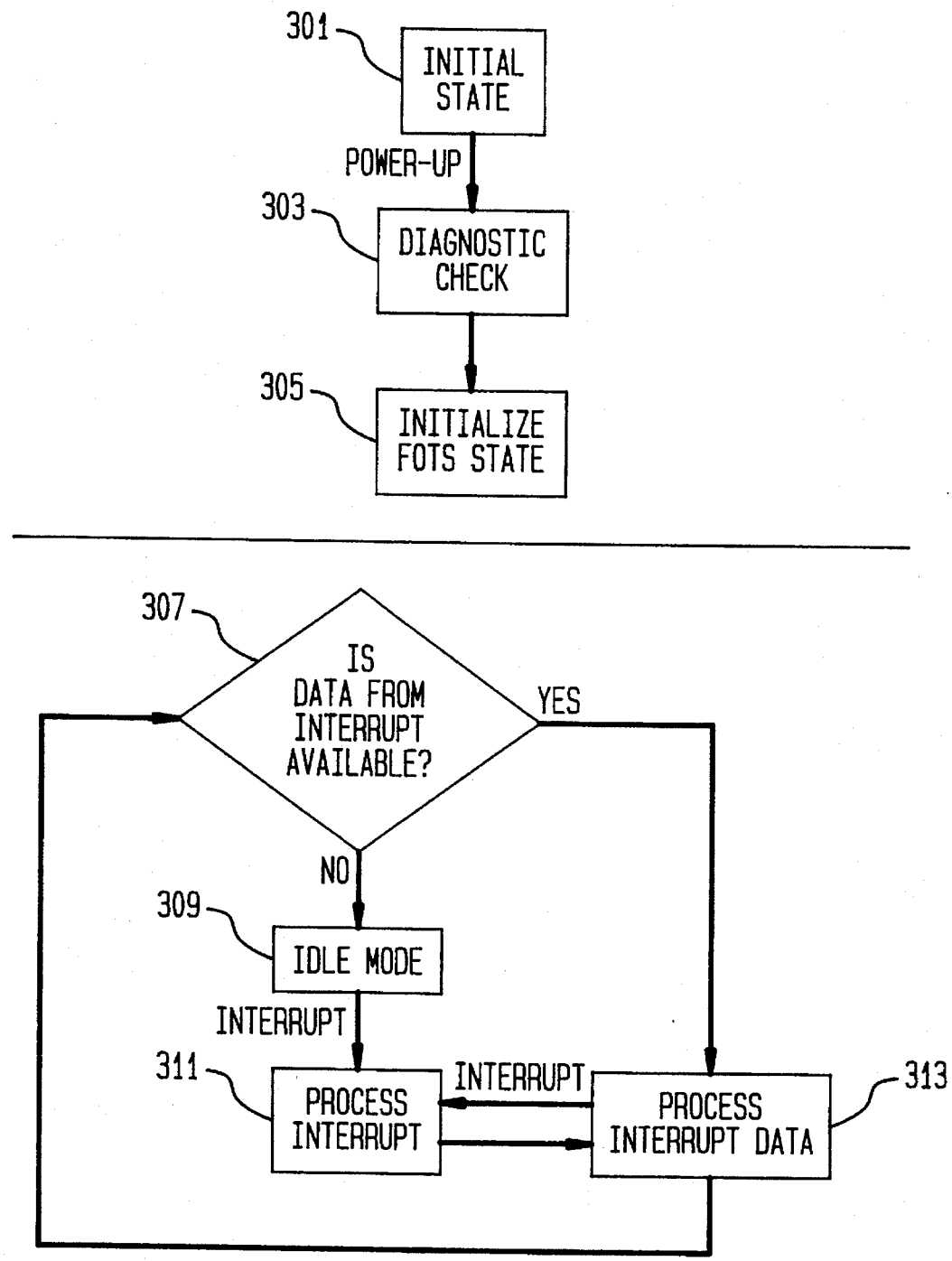
FIG. 9 is a flow diagram of the overall structure and function of a control program for an optical power meter in accordance with the present invention.

FIG. 9 is a flow diagram of the overall structure of the control program for optical power meter 1. The control program is in an initial state at block 301. When a power-on signal is received, a diagnostic check is performed at block 303, and all circuits of both fiber optic test sets (FOTS) are initialized at block 305.

As shown in blocks 307, 309, 311 and 313 of FIG. 9, the control program for optical power meter 1 is interrupt driven. If no interrupt commands or interrupt data are present in the data queue, the program enters the idle mode at block 309. If an interrupt command is received, the program goes to block 311 where this command is processed and then to block 313 where the data corresponding to the command are processed. The program then goes back to block 311, if a further interrupt command is received and requires processing, or to block 307, where the program determines whether further data pertaining to the interrupt commands require processing. If such data are present, the program returns to block 313 to process these data and again returns either to block 307 or block 311. These steps are continued until no further interrupt commands are received or data exist in the data queue, at which point the program returns to the idle mode at block 309.

Figure 10:
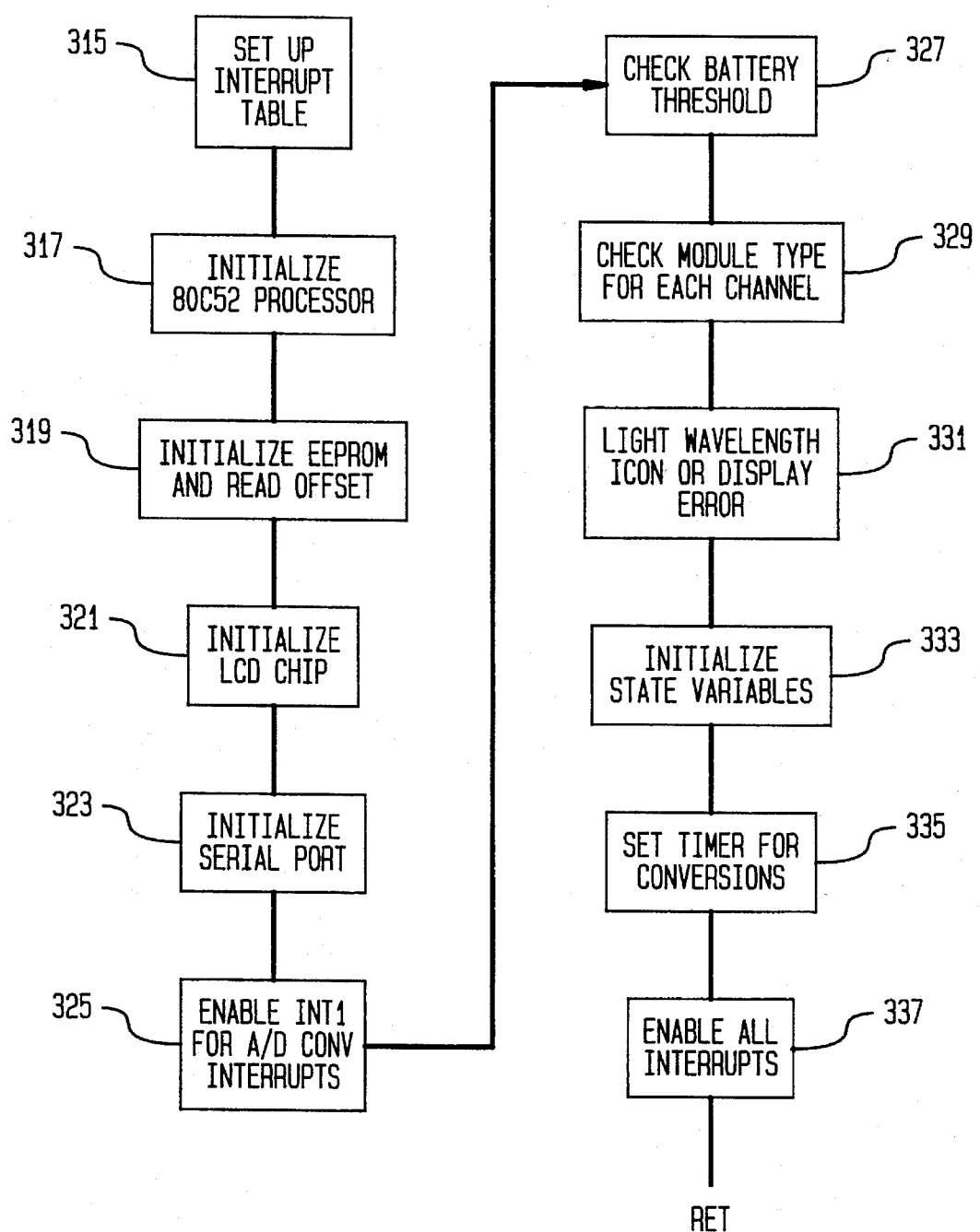
FIG. 10 is a flow diagram of the initialization steps of the control program.

The steps executed by the control program for initializing fiber optic test sets A and B are shown in FIG. 10. Interrupt tables are established at block 315. The program then goes successively to blocks 317, 319, 321 and 323 where, respectively, microprocessor 101 is initialized, the EEPROM associated with the microprocessor is initialized and previously stored offsets are read, LCD display 105 is initialized and the RS 232 interface 123 is initialized. The program then goes to block 325 where the interrupt program for processing conversion data from A/D convertor 117 is enabled and initialized.

The control program then determines, at block 327, whether the batteries powering optical power meter 1 exceed a minimum operating threshold. The program then goes to block 329 where the transmitting wavelength of each module within mainframe unit 2 is read. Based upon this reading, the appropriate indicators within wavelength indicators 35 and 27 for these modules, or the "λ" icon, are displayed at block 331. The program then goes to block 333 where all circuits comprising test sets A and B, and their corresponding variables, are placed in their initial state or mode. The activity timer (power control 127) for optical power meter 1, for automatically deactivating the power meter when no activity occurs within the microprocessor over a predetermined period (e.g., five minutes), is set at block 335. Finally, the initialization algorithm is completed at block 337 where all interrupt programs are enabled.

Figure 11:
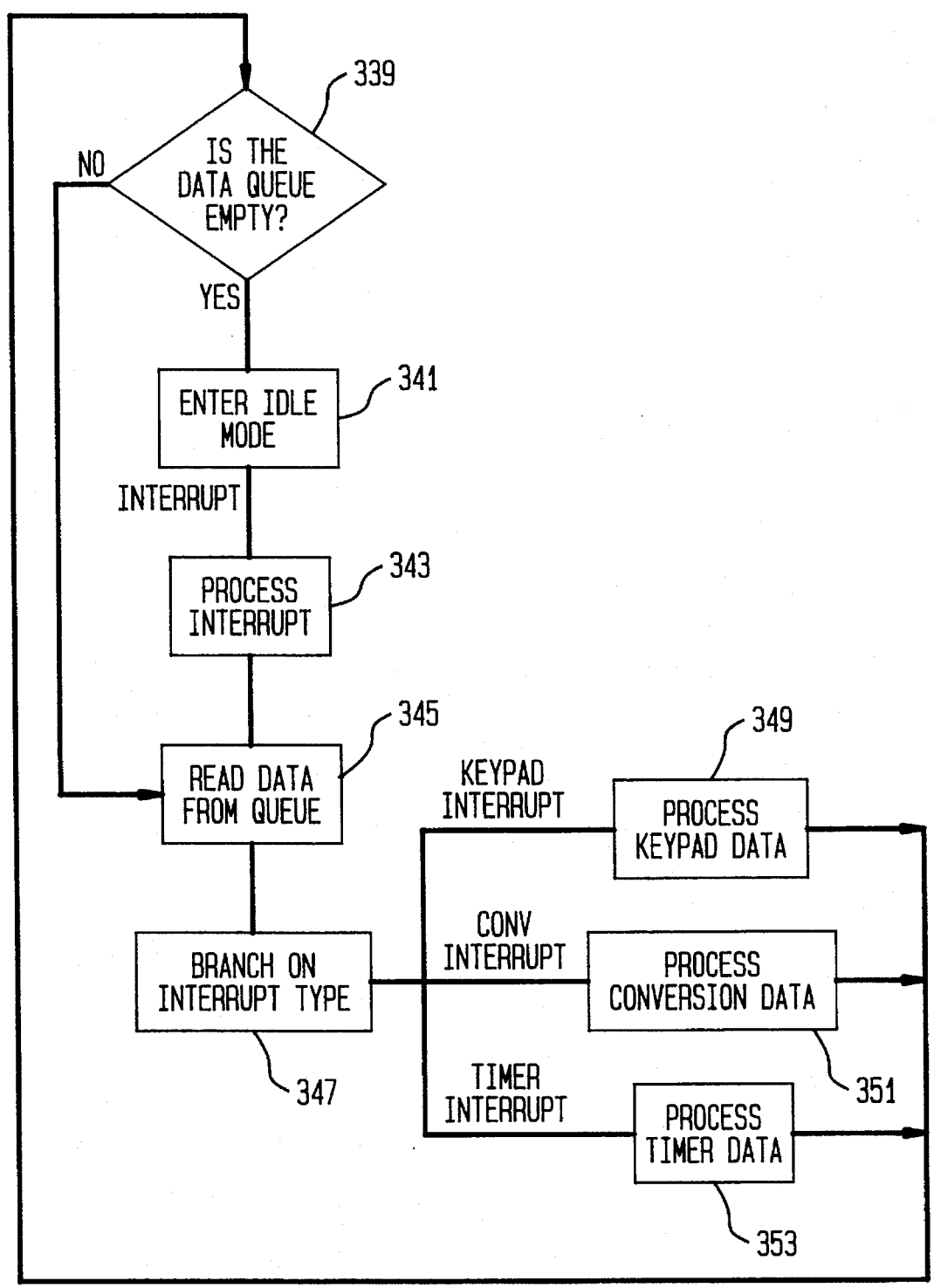
FIG. 11 is a flow diagram of the interrupt processing steps of the control program.

The control program's interrupt processing scheme is shown in greater detail in FIG. 11. The microprocessor processes data sequentially from a data queue maintained in memory. If no data exist in this queue, the program enters the idle mode at block 301. If an interrupt signal is received, the program processes this signal at block 343 and reads data corresponding to the interrupt signal at block 345. The program then branches, at block 347, to the particular interrupt program corresponding to the interrupt signal. The interrupt signal may correspond to the activation of a key on the key pad, the existence of conversion data from the A/D convertor, or the existence of timing data from the timer. Depending upon the particular activity to which the interrupt signal corresponds, the corresponding data in the data queue are processed either by the key pad processing program at block 349, the A/D conversion data program at block 351, or the timer data program at block 353. The program then returns to block 339 where the queue again is examined for existing data. If data are in the queue, the program returns to blocks 345, 347 and the appropriate interrupt processing block, i.e., either block 349, 351, or 353, until the queue is empty, at which point the program returns to the idle mode at block 341.

The processing of the interrupt commands at block 343 of FIG. 11 is shown in greater detail in FIG. 12. If the interrupt signal is in response to the depression of a key on the key pad, the control program reads the key pad data at block 355 and stores these data in the data queue at block 357. As a result of this key pad activity, the timer count is reinitialized to zero at block 359, and, at block 361, the key pad interrupt is cleared.

If the interrupt signal is a signal from the timer, the control program reads the current timer count at block 363 and, at block 365, increments this count and stores the new timer count in the data queue at block 365. The control program writes the new timer count value in memory at block 367 and, at block 369, clears the timer interrupt. If both test sets A and B are in the talk mode, the control program then returns to the data queue and, if this queue is empty, to the idle mode.

If both test sets are not in the talk mode, however, the control program goes to block 371 where it determines whether test set A has an error condition or is in the talk mode. If either of these conditions exists, the program moves to block 375 where it determines whether channel B has an error condition or is in the talk mode. If either of these conditions exists, the program returns to the data queue and, if this queue is empty, to the idle mode. If neither of these conditions exist, however, the program moves to block 377 where the conversion of data from the A/D convertor for test set B is initiated, and these data are stored in this test set's associated memory for the storage of conversion data. The program then returns to the data queue and, if this queue is empty, to the idle mode.

On the other hand, if at block 371, test set A neither is in the talk mode nor has an error condition, the control program moves to block 373 where the conversion of data from the A/D convertor for test set A is initiated and stored in this test set's associated memory for the storage of conversion data. The program then returns to the data queue or idle mode. Also, if at block 375, test set B either is in the talk mode or has an error condition, the control program returns to the data queue or the idle mode.

Finally, if the interrupt signal is in response to output data from the A/D convertor, the A/D converter is held and a run of conversion data are taken from the A/D convertor at block 379. The program then goes to block 381, where these conversion data are read, and to block 383 where these conversion data are stored in the data queue. The A/D conversion interrupt signal is cleared at block 385. The program then moves to block 387 where it determines whether the conversion data pertain to test set A. If these data pertain to this test set, the program goes to block 389 where the program determines whether test set B is in the talk mode or has an error condition. If either of these conditions exist, the program returns to the data queue or idle mode at block 389. On the other hand, if neither of these conditions exist, the program moves to block 391 where the conversion of data from the A/D convertor for test set B is initiated, and these data are stored in this test set's associated memory for the storage of conversion data. Also, if the program determines at block 387 that the current conversion data do not pertain to test set A, the program returns to the data queue or idle mode from this block.

Figure 13A:
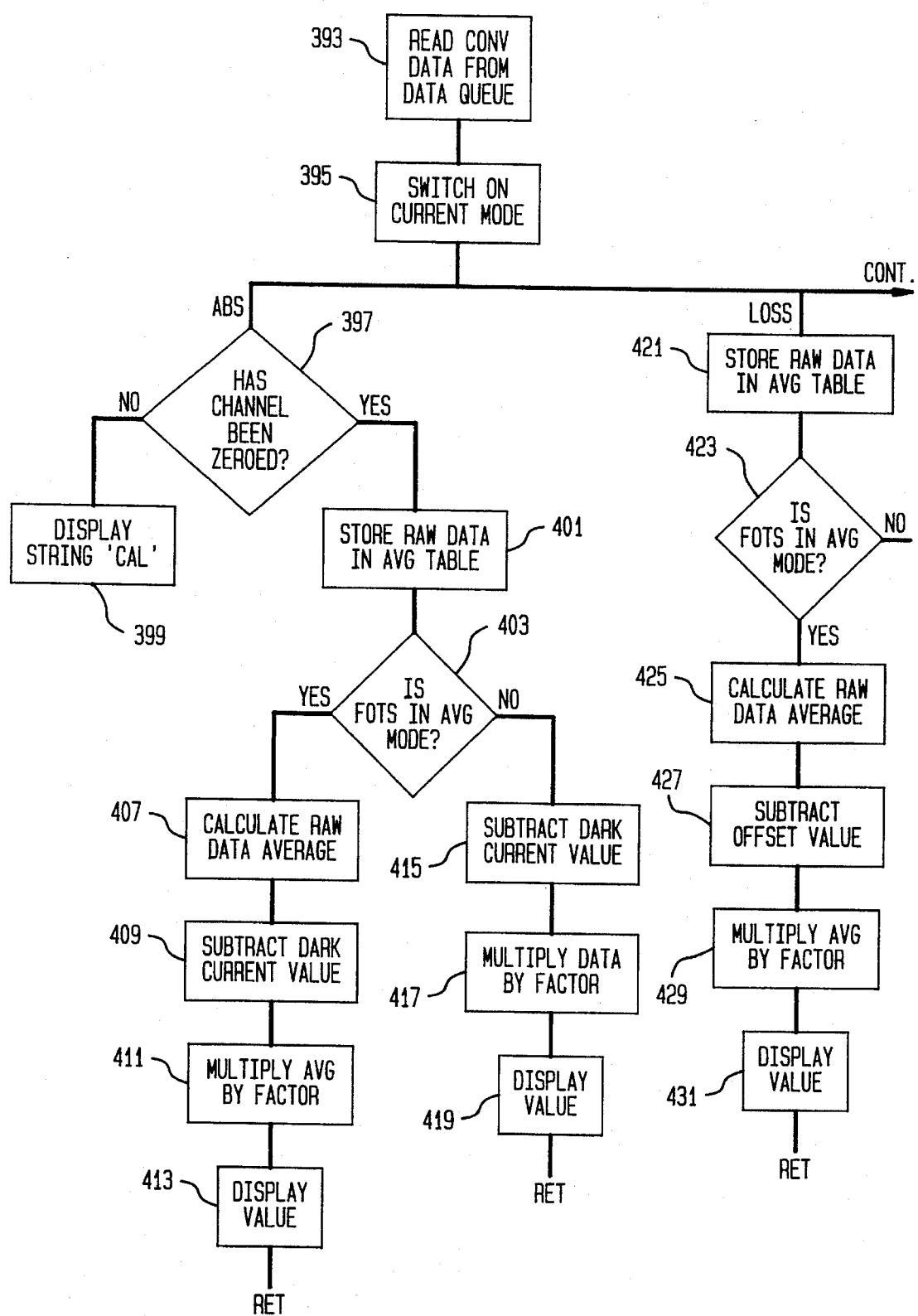
FIG. 13($a$) is a flow diagram showing in greater detail the steps of processing of conversion data generally shown in FIG. 12.
Figure 13B:
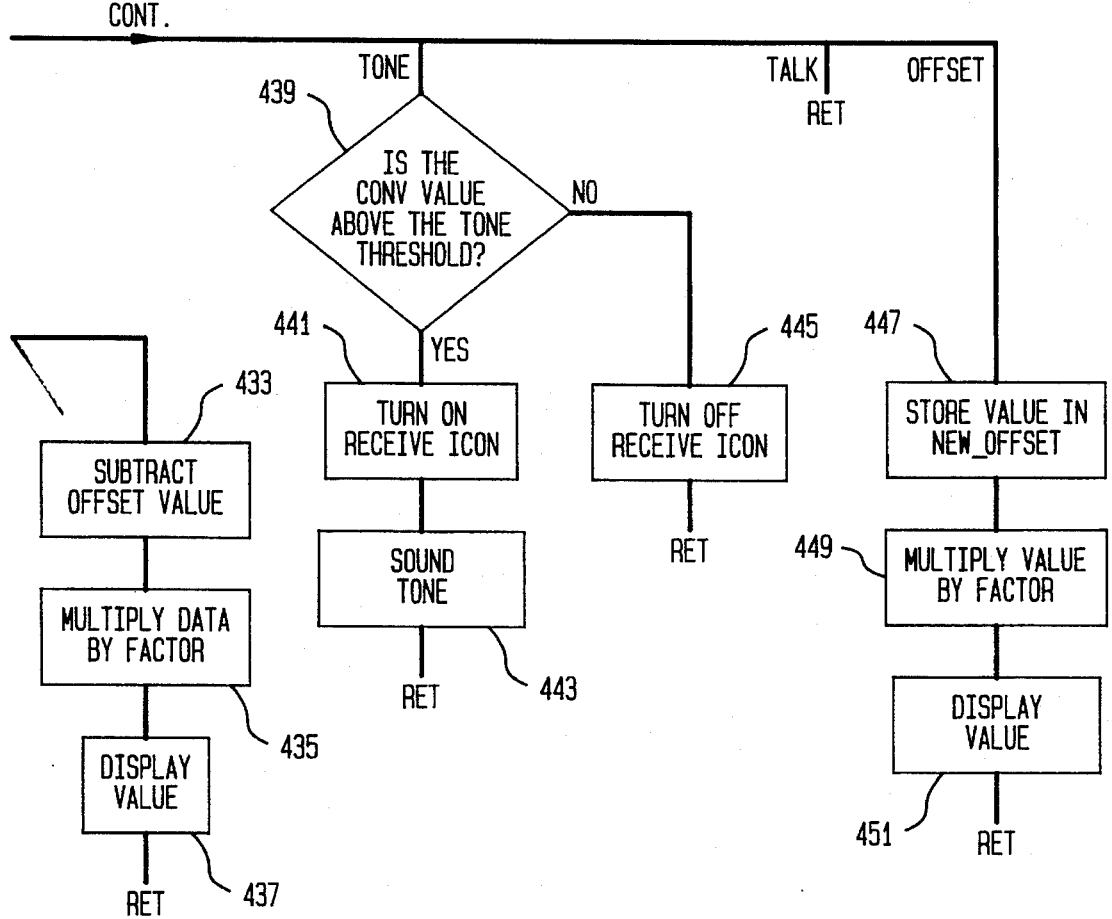

The processing of conversion data, shown generally at block 351 in FIG. 11, is shown in greater detail in FIG. 13. Conversion data from the A/D convertor are read from the data queue at block 393 and, at block 395, the program branches to the subroutine controlling the mode of operation of the test set to which these data correspond. If this test set is in the absolute power reading mode, the program goes to block 397 where it determines whether this test set's circuits have been zeroed. If zeroing has not occurred, the control program goes to block 399 where the character string for the letters "CAL" are displayed in display screen 17 dedicated to this test set. On the other hand, if the test set has been zeroed, the program goes to block 401 where the raw conversion data are stored in the averaging table. The program then goes to block 403 where the program determines whether optical power meter 1 is in the average power reading mode. If the power meter is in this mode, the program goes to block 407 where the conversion data in the averaging table are averaged and then to block 409 where the conversion value for an inactive circuit, the "dark value," is subtracted from the average value. The resulting value then is multiplied by a conversion factor at block 411 and, at block 413, the final result is displayed in the location of display screen 17 dedicated to this test set.

On the other hand, if at block 403, the control program determines that optical power meter 1 is not in the power averaging mode, the program goes to block 415 where the dark value for the test set is subtracted from the current conversion data. The resulting value is multiplied by a conversion factor at block 417, and the final result is displayed at block 419.

If the test set to which the conversion data correspond is in the relative power reading (loss) mode, the conversion data are stored in the averaging table at block 421. The control program then determines, at block 423, whether optical power meter 1 is in the power averaging mode. If the power meter is in this mode, the program goes to block 425 where the conversion data in the averaging table are averaged and then to block 427 where the current offset value is subtracted. The resulting value is multiplied by the conversion factor at block 429, and, at block 431, the final result is displayed in the location of display screen 17 dedicated to this test set.

On the other hand, if the control program determines at block 423 that the optical power meter is not in the power averaging mode, the program goes to block 433 where the current offset value is subtracted from the current conversion data and then to block 435 where the resulting value is multiplied by the conversion factor. The final result is displayed at the appropriate location on display screen 17 at block 437.

In the loss mode, microprocessor 101 monitors the result displayed at block 431 or 437. If this result becomes constant with respect to time, the microprocessor deactivates the test set's associated source in order to preserve battery life, while continuing to display this constant result in the test set's corresponding display area 37 or 23.

If at block 395, the control program determines that the test set to which the conversion data correspond is in the tone modulation mode, the program goes to block 439 where it determines whether the value of the conversion data is above the magnitude of the predetermined threshold. If this value is above this threshold, the program goes to block 441 where the sound icon is displayed within either mode indicators 19 or 43 and then to block 443 where the sound transmitter (piezoelectric transducer 121) is activated. On the other hand, if at block 439, the control program determines that the value of the conversion data is below the predetermined threshold, the sound icon is turned off within the appropriate mode indicators at block 445.

If at block 393, the control program determines that the test set to which the conversion data correspond is in the talk mode, the program returns directly to the data queue.

Finally, if at block 393, the control program determines that the test set to which the conversion data correspond is in the read and store offset power mode, the program goes to block 447 where the new offset value is stored in memory. The program then goes to block 449 where this new value is multiplied by an appropriate conversion factor and then to block 451 where the new offset value is displayed at the appropriate power display location within display screen 17.

Figure 14:
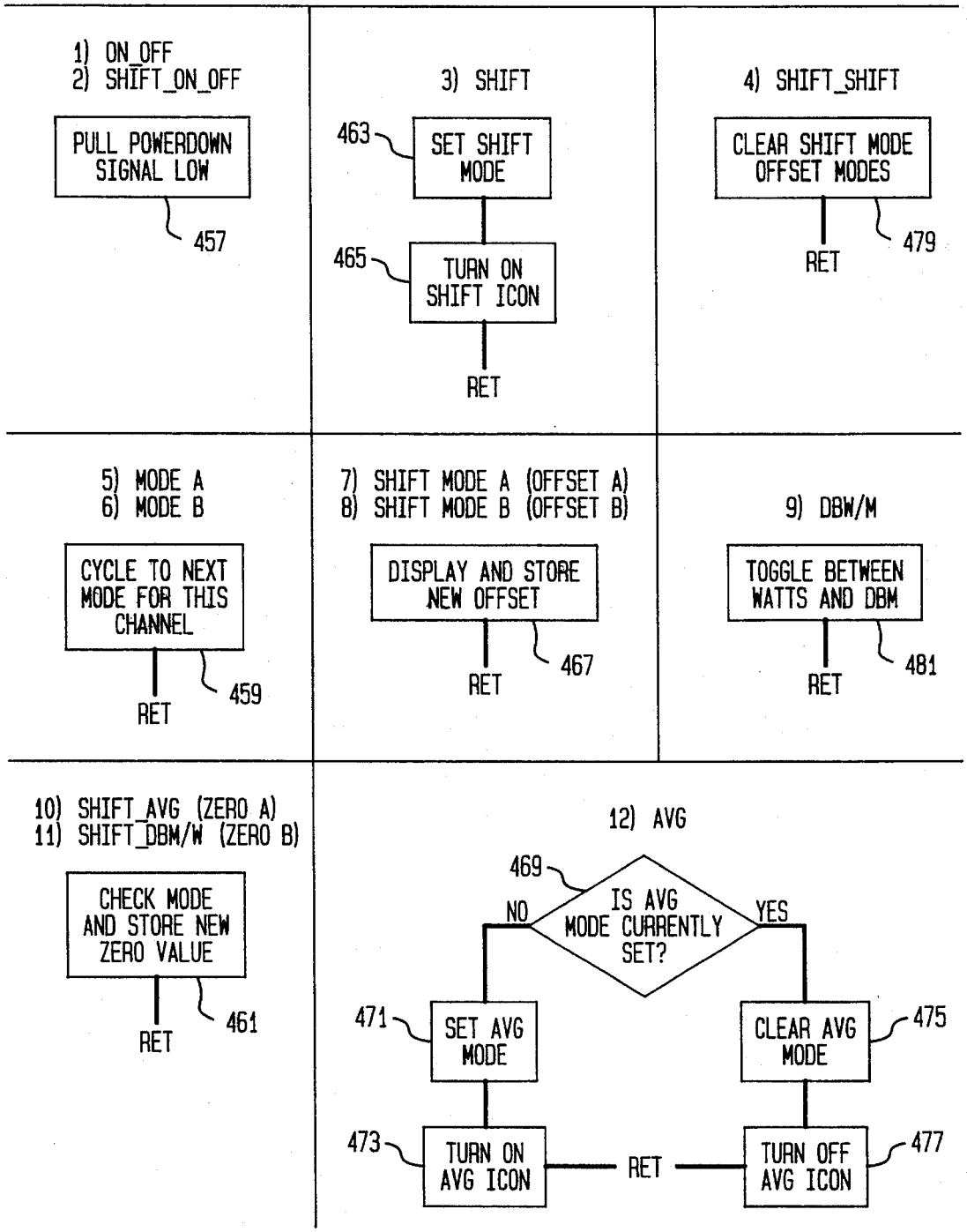
FIG. 14 is a flow diagram showing in greater detail the steps of processing of key pad data generally shown in FIG. 11.

The processing of the key pad data shown generally in block 349 of FIG. 11 is shown in greater detail in FIG. 14. The key pad data from the data queue are read by the control program at block 453 and combined with the shift flag, indicating whether the shift modes have been selected, at block 455. The key pad data in combination with the shift flag provide twelve possible branches for the control program, as described below.

If optical power meter 1 is in either the normal or shifted modes of operation and the data from the key pad represent a power-down signal, the control program goes to block 457 where the optical power meter is turned off.

If the optical power meter is in the normal mode of operation and the data read from the data queue represent the shift mode signal, the control program goes to block 463 where the shift mode is set and then to block 465 where the shift icon (shift indicator 29) is turned on. If the power meter is operating in the shift mode, on the other hand, the control program goes to block 479 where the shift mode and shift icon are cleared, and the optical power meter is returned to the normal mode.

If the optical power meter is in the normal mode of operation and the data from the data queue represent a signal from mode key 59 or 49, the control program goes to block 459 where the test set corresponding to the activated mode key is cycled to the next mode of operation. If the optical power meter is operating in the shift mode of operation and the data from the data queue represent a signal from either of these keys, the control program goes to block 467 where the pertinent test set's corresponding offset is read, stored and displayed.

If the key pad data read from the data queue represent activation of power units key 53 and the power meter is in the normal operating mode, the control program branches to block 481 where the dBm mode of operation is set, if the power meter presently is operating in the watts mode, and vice versa.

If the data read from the data queue indicate activation of either power averaging key 63 or power units key 53 and the power meter is operating in the shift mode, the control program branches to block 461 where the circuits of the test set corresponding to the activated key are zeroed.

Finally, if the data read from the data queue indicate activation of power averaging key 63 and the optical power meter is in the normal mode of operation, the control program branches to block 469 where it determines whether the power meter currently is operating in the power averaging mode. If the power meter is in this mode, the control program goes to block 475 where this mode of operation is cleared and then to block 477 where power averaging indicator 33 is turned off. On the other hand, if the control program determines at block 469 that the power meter is not in the power averaging mode of operation, the program goes to block 471 where the power averaging mode of operation is set and then to block 473 where power averaging indicator 33 is turned on.

The key pad data processing steps generally represented in FIG. 14, at blocks 459, 461, 467 and 479, are disclosed in greater detail in FIG. 15. First, the steps for clearing the shift mode of operation are shown at blocks 483–493. The shift modes are cleared at block 483, and shift indicator 29 is turned off at block 485. The control program then goes to block 487 where it determines whether either test set is in the offset mode. If neither test set is in this mode, the control program returns to the data queue or idle mode. On the other hand, if one of the test sets is in this mode, the control program goes to block 489 where the mode of that test set is set to the loss mode and then to blocks 491 and 493 where, respectively, the test set's corresponding offset indicators 41 or 21 are turned off and the test set's corresponding loss mode indicator, within mode indicators 43 or 19, is turned on.

The steps executed by the control program in response to activation of either mode key 59 or 49 in the shift mode are shown at blocks 495–519. The control program determines at block 495 whether the corresponding test set is in the offset mode. If this test set is in this mode, the control program branches to block 497 where the new offset value is displayed in the test set's display screen and is stored in memory, and then to block 499 where the test set is returned to the loss mode of operation. The control program then goes to block 501 where the test set's corresponding offset indicators 41 or 21 are turned off and then to block 503 where the test set's corresponding loss indicator within indicators 43 or 19 is turned on.

On the other hand, if at block 495 the control program determines that neither test sets A nor B is in the offset mode, the control program branches to block 505 where it determines whether the test set corresponding to the activated mode key is in the loss mode of operation. If this test set is in this mode, the control program branches to block 507 where this test set's offset mode of operation is set and then to block 509 where its averaging table is cleared. The program then goes to block 511 where the corresponding loss indicator within indicators 43 or 19 is turned off and then to block 513 where the corresponding offset indicator 41 or 21 is turned on.

If at block 505, the control program determines that the test set corresponding to the activated key is not in the loss mode, on the other hand, the control program branches to block 515 where the display string for the letters "LOS" are displayed in the test set's corresponding power display area 37 or 23. The program then goes to block 517 where it determines whether this display message has been activated for two seconds and, if two seconds have elapsed, the control program goes to block 519 where this error message is cleared.

The steps executed by the control program for zeroing the test set's circuits are shown at blocks 521–535. The control program first branches to block 521 where it determines whether the test set to be zeroed is in the relative power, tone modulation, or voice modulation mode of operation. If the test set is in any of these modes, the control program branches to block 535 where the display string for the letters "ABS" are displayed in the test set's corresponding power display area 37 or 23. The control program then goes to block 533 where it determines whether this message has been displayed for two seconds, and, if two seconds have elapsed, the control program goes to block 531 where this error message is cleared.

On the other hand, if at block 521, the control program determines that the test set's current mode of operation is neither the relative power loss, tone modulation or voice modulation mode, the control program branches to block 523 where it determines whether the test set is in the absolute power reading mode. If the test set is not in this mode, the control program returns to the data queue or idle state. On the other hand, if the test set is in the absolute power reading mode, the control program goes to block 525 where the last conversion value for this test set is stored as the zero (dark) value for this test set. The control program then goes to block 527 where this same step is repeated and then to block 529 where the zero flag for the appropriate test set is set.

The steps executed by the control program in response to activation of either mode key 59 or 49 in the normal mode are shown at blocks 537–577. The control program determines the current mode of operation at block 537 and then branches either to blocks 539, 547, 561, or 573, depending upon the current mode. If the current mode is the absolute power reading mode, the control program goes to block 539 where the test set to which the activated mode key corresponds is set to the relative power reading mode, and then to block 541 where the multiplex values for activating the test set's associated source are set. The control program then goes to block 543 where the appropriate relative power (loss) icons within mode indicators 43 or 19 are turned on and then to block 545 where the test set's averaging table is cleared.

If the current mode of operation for the test set is the relative power reading (loss) mode, the control program goes from block 537 to block 547 where the test set is set to the tone modulation mode, and then to block 549 where the multiplex values are set to modulate the test set's corresponding source with the tone signal. The control program then goes to block 551 where the test set's corresponding relative power icons within mode indicators 43 or 19 are turned off and then to block 553 where the tone sending icon within these corresponding indicators is turned on. The program then goes to block 555 where the digits within the test set's corresponding power display area 37 or 23 are cleared and then to block 557 where the test set's corresponding power units indicators are turned off. The test set's averaging table is cleared at block 559.

If the current mode of operation for the test set is the tone modulation mode, the control program branches from block 537 to block 561 where the test set is set to the voice modulation (talk) mode. The control program then goes to block 563 where the multiplex values are set to modulate the test set's corresponding source with voice signals received at headphone/microphone jack 69 and to demodulate voice signals received at the test set's corresponding input terminal connector. The control program then goes to block 567 where the test set's associated tone sending icon within mode indicators 43 or 19 is turned off and then to block 569 where the test set's associated tone receive icon within these indicators also is turned off. The control program, at block 571, turns on the test set's corresponding voice modulation (telephone handset) icon within these indicators at block 571.

Finally, if the current mode of operation for the test set is the voice modulation (talk) mode, the control program branches from block 537 to block 573 where the test set is returned to the absolute power reading mode. The control program then goes to block 573 where the multiplex values for activating the test set's associated source are cleared and then to block 577 where the test set's corresponding telephone handset icon within mode indicators 43 or 19 is turned off.

Figure 16:
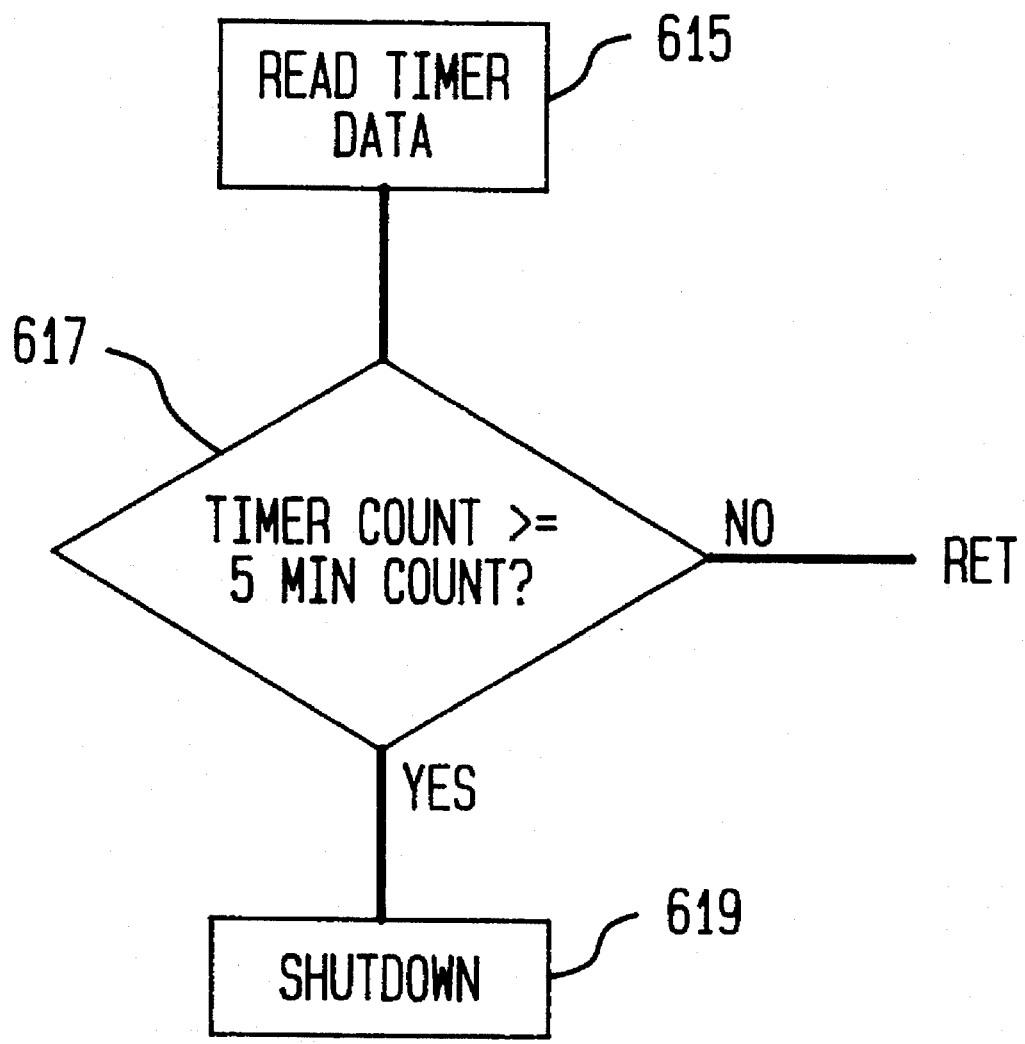
FIG. 16 is a flow diagram showing the steps of processing timer data generally shown in FIG. 11.

The steps for processing timer data shown generally in block 353 of FIG. 11 are shown in greater detail in FIG. 16. The control program reads the current timer count at block 615 and then goes to block 617 where it determines whether this count is greater than or equal to the count representing five minutes. If the timer count is greater than or equal to this five-minute count, the control program goes to block 619 where optical power meter 1 is automatically turned off. On the other hand, if the timer count is less than five minutes, the control program returns to the idle mode or processing the data queue.

Figure 17:
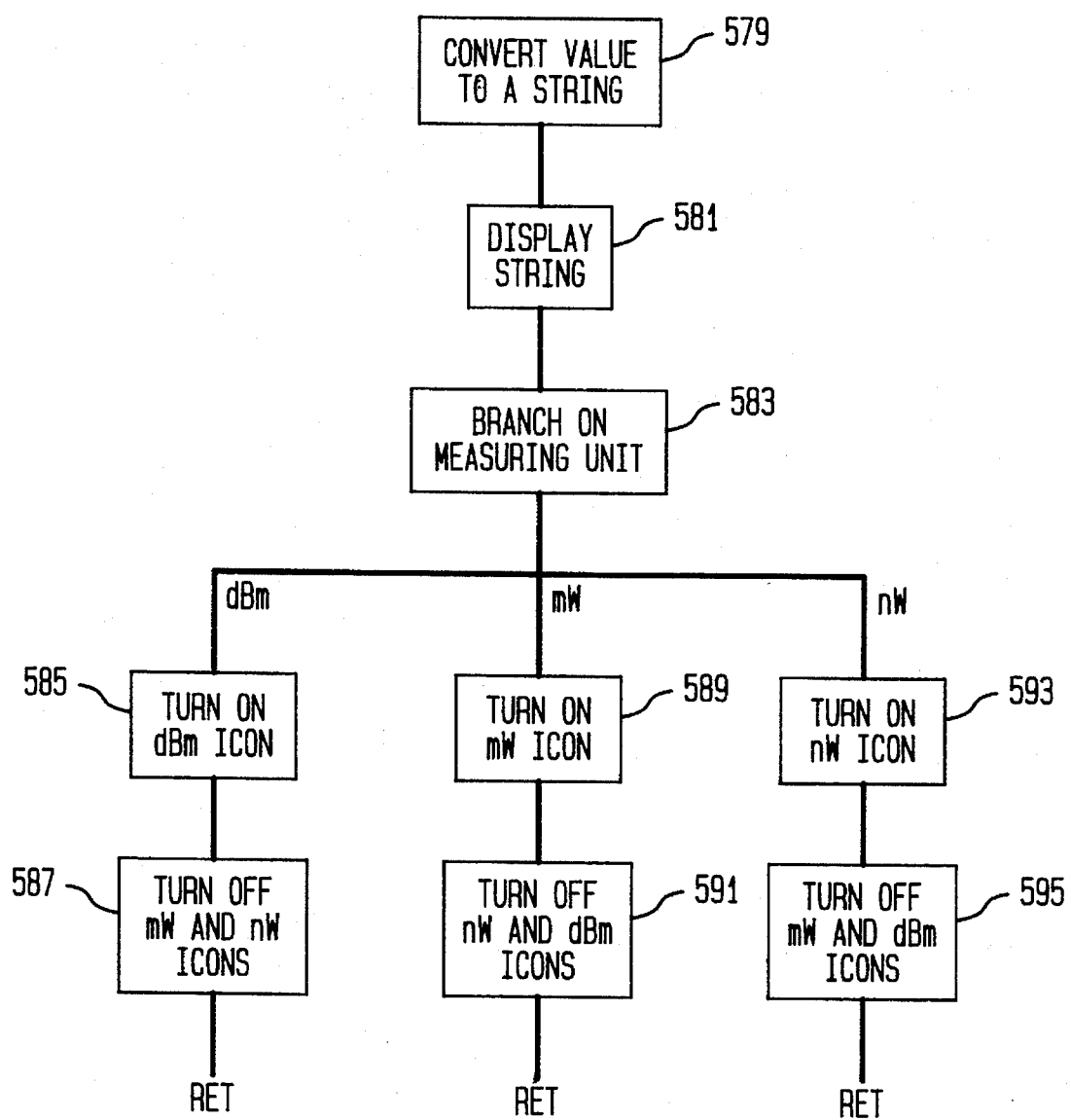
FIG. 17 is a flow diagram of the steps for displaying the magnitude of power detected by the optical power meter.

FIG. 17 shows the steps executed by the control program for displaying within display screen 17 the magnitude of power read by test set A or B. The control program converts the value read from the appropriate test set's sensor to a numerical string at block 579. The control program then goes to block 581 where this string is displayed in the test set's corresponding power display 37 or 23. The control program then goes to block 583 from which it branches to the appropriate subprogram for displaying power units. If the units selected are dBm, the control program goes to block 585 where the test set's corresponding dBm indicator within power units indicators 39 or 25 is illuminated. The control program then goes to block 587 where the mW and nW indicators for this test set's power units indicators are turned off.

On the other hand, if the units selected are watts, the control program branches from block 583 to either block 589 or 593, depending upon whether, in view of the magnitude of power read, power should be displayed in mW or nW. If a display in microwatts is appropriate, the control program goes to block 589 where the test set's corresponding indicator for mW within power units indicators 39 or 25 is turned on and then to block 591 where the test set's indicators for nW and dBm are turned off. If the appropriate units for display are nanowatts, on the other hand, the control program goes to block 593 where the indicator for nW within the test set's corresponding power units indicators is turned on and then to block 595 where the test set's indicators for mW and dBm are turned off.

Figure 18:
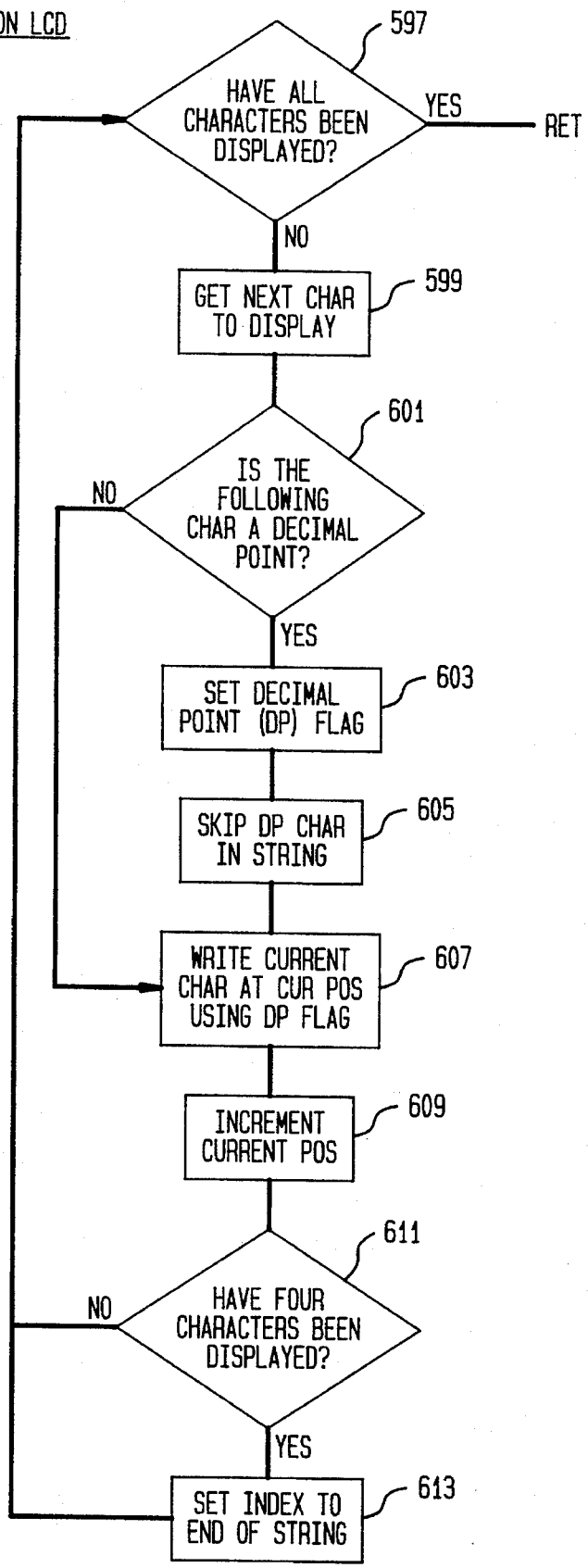
FIG. 18 is a flow diagram of the steps for displaying a numerical string of power data generally shown in FIG. 17.

The display of a numerical string within power display 37 or 23, shown generally in block 581 of FIG. 17, is shown in greater detail in FIG. 18. Each of these displays contains five positions, four of which are assigned to digits (characters) and one of which is assigned to the decimal point. The control program determines at block 597 whether four characters have been displayed in the test set's corresponding power display 37 or 23. If four characters have been displayed, the control program leaves this subroutine. On the other hand, if four characters have not been displayed, the control programs reads the next character for display at block 599 and determines at block 601 whether this character is a decimal point. If the next character is a decimal point, the control program goes to block 603 where the decimal point flag is set and then to block 605 where the decimal point character in the string is skipped. The control program then goes to block 607 where the current character is written into the current position of the power display using the decimal point flag. The control program then goes to block 609 where the current position is incremented and then to block 611 where the control program again determines whether four characters have been displayed. If four characters have been displayed, the control program goes to block 613 where the index for ending the string is set. The control program then returns to block 597 where it terminates this subroutine after confirming that all four characters have been displayed.

On the other hand, if at block 601 the control program determines that the following character is not a decimal point, the control program goes directly to block 607 where the current character is written into the current position within the power display using the decimal point flag. The control program then goes to blocks 609, 611 and 613 as previously described. Also, if at block 611 the control program determines that all four characters have not been displayed, the control program returns directly to block 597.

Although particular embodiments of the present invention have been shown and described, many varied embodiments incorporating the teachings of the present invention easily may be constructed by those skilled in the art.

I claim:

1. A fiber optic power meter, comprising:

a hand-size mainframe unit;

a plurality of separable modules, each of said modules comprising source means for providing a source of an optical signal having optical characteristics, sensor means for sensing said optical signal, first connecting means for connecting said source means and said sensor means to a fiber optic circuit, and second connecting means for connecting said module to said mainframe unit;

modulating means for modulating, for each of said modules, the optical signal from said module's sensor with a further audio signal;

demodulating means for demodulating, for each of said modules, said further audio signal and for providing an audible sound in response to said further audio signal;

magnitude means for determining, for each of said modules, the magnitude of optical power in the optical signal sensed by said module's sensor means;

said mainframe unit comprising means for receiving and connecting said plurality of separable modules, a plurality of numerical display means for displaying numerals representative of the optical power determined by said magnitude means, and a plurality of control means for controlling said modules' source means and said display means, and association means for associating each of said modules' source means and sensor means with one of said display means and one of said control means to form a plurality of independent, simultaneously operable test sets, each of said test sets comprising a source means, a sensor means, a display means and a control means, whereby the magnitude of optical power in the optical signal sensed by each of said test set's associated sensor means is independently displayed by said test set's associated display means, and each of said test set's associated source means and associated display means is independently controlled by said test set's associated control means, and wherein each of said test set's associated control means further comprises selection means for selectively activating either said modulating means and said demodulating means, to independently modulate the optical signal of said test set's associated source with said further audio signal and for providing said audible sound in response to said further audio signal, or said magnitude means to cause said test set to determine and display the magnitude of optical power in the optical signal sensed by said test set's associated sensor means.

2. A fiber optic power meter as in claim 1, wherein the first connecting means for each of said modules is adapted for connection to an optical interface terminal.

3. A fiber optic power meter as in claim 1, wherein the first connecting means for each of said modules is adapted for connection to an optical interface terminal, and wherein each of said modules' first connecting means is adapted for connection to an optical interface terminal different in kind from the optical interface terminal for which all other modules' first connecting means are adapted.

4. A fiber optic power meter as in claim 1, wherein each of said modules comprises means for automatically informing said mainframe unit of the optical characteristics of said module's associated source of an optical signal.

5. A fiber optic power meter as in claim 4, wherein said optical characteristics comprise the wavelength of the optical signal transmitted by said source.

6. A fiber optic power meter as in claim 1, wherein each of said modules further comprises calibrating means for calibrating said module's source and sensor.

7. A fiber optic power meter as in claim 6, wherein said calibrating means comprises means for calibrating said sensor's optical sensitivity and the magnitude of power of said source's optical signal.

8. An optical power meter as in claim 1, wherein said magnitude means further comprises, for each of said test sets, absolute power means for determining the absolute optical power in the optical signal sensed by said test set's associated sensor means, and relative-power means for determining the relative optical power, with respect to the transmitting power of said test set's associated source means, in the optical signal sensed by said test set's associated sensor means, and wherein said selection means further comprises, for each of said test sets, means for selectively activating either said absolute-power means or said relative-power means to cause said test set to determine and display either the absolute optical power, or the relative optical power, in the optical signal sensed by said test set's associated sensor means.

9. An optical power meter as in claim 8, wherein said mainframe unit further comprises, for each of said test sets, means for deactivating said test set's associated source when the relative optical power sensed by said test set's associated sensor becomes constant with respect to time.

10. An optical power meter as in claim 8, wherein said mainframe unit further comprises, for each of said test sets, means for reading and storing the transmitting power of said test set's associated source.

11. An optical power meter as in claim 1, wherein said modulating means comprises means for modulating the optical signal from a selected one of said modules with a further audio signal having a constant frequency within the audible frequency range.

12. An optical power meter as in claim 1, wherein said modulating means comprises means for modulating the optical signal from a selected one of said modules with a further audio signal comprising a voice modulated signal.

13. An optical power meter as in claim 1, wherein said mainframe unit further comprises means for automatically deactivating said power meter when said power meter is inactive for a predetermined period of time.

14. An optical power meter as in claim 1, further comprising an output terminal for transmitting to a printer in digital format data collected by said power meter.

* * * * *